(12) United States Patent
Topiwala et al.

(10) Patent No.: US 10,834,400 B1
(45) Date of Patent: Nov. 10, 2020

(54) ENHANCEMENTS OF THE AV1 VIDEO CODEC

(71) Applicant: FASTVDO LLC, Melbourne, FL (US)

(72) Inventors: Pankaj N. Topiwala, Cocoa Beach, FL (US); Wei Dai, Clarksville, MD (US); Madhu Peringassery Krishnan, Columbia, MD (US)

(73) Assignee: FastVDO LLC, Melburne, FL (US)

( * ) Notice: Subject to any disclaimer, the term of this patent is extended or adjusted under 35 U.S.C. 154(b) by 54 days.

(21) Appl. No.: 15/682,518

(22) Filed: Aug. 21, 2017

Related U.S. Application Data

(60) Provisional application No. 62/377,311, filed on Aug. 19, 2016.

(51) Int. Cl.
| | | |
|---|---|---|
| *H04N 19/186* | (2014.01) | |
| *H04N 19/12* | (2014.01) | |
| *H04N 19/117* | (2014.01) | |
| *H04N 19/124* | (2014.01) | |
| *H04N 19/46* | (2014.01) | |
| *H04N 19/177* | (2014.01) | |
| *H04N 19/172* | (2014.01) | |
| *H04N 19/174* | (2014.01) | |
| *H04N 19/176* | (2014.01) | |

(52) U.S. Cl.
CPC ........... *H04N 19/12* (2014.11); *H04N 19/117* (2014.11); *H04N 19/124* (2014.11); *H04N 19/46* (2014.11); *H04N 19/172* (2014.11); *H04N 19/174* (2014.11); *H04N 19/176* (2014.11); *H04N 19/177* (2014.11)

(58) Field of Classification Search
None
See application file for complete search history.

(56) References Cited

U.S. PATENT DOCUMENTS

| | | |
|---|---|---|
| RE40,081 E | 2/2008 | Tran et al. |
| 8,155,462 B2 | 4/2012 | Tran et al. |
| 8,428,135 B2 | 4/2013 | Tourapis et al. |
| 8,520,736 B2 | 8/2013 | Topiwala |
| 8,548,265 B2 | 10/2013 | Tran et al. |
| 8,913,660 B2 | 12/2014 | Tourapis et al. |
| 9,609,336 B2 | 3/2017 | Topiwala et al. |

(Continued)

OTHER PUBLICATIONS

Bjontegaard, G., "Calculation of average PSNR differences between RD-curves," ITU-Telecommunications Standardization Sector, VCEG-M33, Apr. 2-4, 2001, pp. 1-4.

(Continued)

*Primary Examiner* — Christopher G Findley
(74) *Attorney, Agent, or Firm* — Fenwick & West LLP

(57) ABSTRACT

Encoding and decoding systems disclosed enhance the AV1/VPX codecs in the context of 8-bit SDR video and 10-bit HDR video content, for applications including streaming and high quality coding for content contribution editing. For SDR content, lapped biorthogonal transforms for near lossless applications and used and optimized resampling filter pairs for adaptive resolution coding in streaming applications are used. For HDR content, a data adaptive grading technique in conjunction with the VP9/VP10 encoder may be used. The encoding/decoding system provides substantial value in the coding of HDR content, and provides backward compatibility with SDR.

20 Claims, 30 Drawing Sheets

(56) References Cited

U.S. PATENT DOCUMENTS

| | | | |
|---|---|---|---|
| 2011/0115980 | A1 | 5/2011 | Shmueli et al. |
| 2014/0254928 | A1 | 9/2014 | Tsai et al. |
| 2014/0307785 | A1 | 10/2014 | Topiwala et al. |
| 2014/0369618 | A1 | 12/2014 | Asaka et al. |
| 2015/0221280 | A1* | 8/2015 | Van Der Vleuten ........................ H04N 1/6027 382/167 |
| 2015/0358646 | A1 | 12/2015 | Mertens |
| 2016/0360212 | A1 | 12/2016 | Dai et al. |
| 2016/0366449 | A1 | 12/2016 | Stessen et al. |
| 2017/0078706 | A1 | 3/2017 | Van Der Vleuten et al. |
| 2018/0098094 | A1* | 4/2018 | Wen ........................ H04N 19/46 |
| 2018/0152721 | A1* | 5/2018 | Rusanovskyy ...... H04N 19/186 |
| 2018/0242006 | A1* | 8/2018 | Kerofsky ................ H04N 19/70 |
| 2019/0052908 | A1* | 2/2019 | Mertens ............... H04N 19/186 |

OTHER PUBLICATIONS

Dai, W. et al., "Regularity-constrained pre-and post-filtering for block DCT-based systems," IEEE Transactions on Signal Processing, Oct. 2003, vol. 51, No. 10, pp. 2568-2581.

Dai, W. et al., "Advanced Resampling Filters for Spatial Scalability and Chroma Sampling Applications in HEVC," Joint Collaborative Team on Video Coding (JCT-VC) of ITU-T SG16 WP3 and ISO/IEC JTC1/SC29/WG11, JCTVC-F618R3, Jul. 14-22, 2011, pp. 1-8.

Davies, T. et al., "AHG-18: Adaptive Resolution Coding (ARC)," Joint Collaborative Team on Video Coding (JCT-VC) of ITU-T SG16 WP3 and ISO/IEC JTC1/SC29/WG11, JCTVC-G264, Nov. 21-30, 2011, 12 pages.

Francois, E. et al., "Common Test Conditions for HDR/WCG video coding experiments," Joint Collaborative Team on Video Coding (JCT-VC) of ITU-T SG 16 WP 3 and ISO/IEC JTC 1/SC 29/WG 11, JCTVC-X1020, May 26-Jun. 1, 2016, pp. 1-30.

ITU-R BT.2020, "Parameter Values for ultra-high definition television systems for production and internal programme exchange," International Telecommunications Union, Aug. 2012, 7 pages.

Mukherjee, D. et al., "The latest open-source video codec VP9—An overview and preliminary results," IEEE Picture Coding Symposium, 2013, pp. 390-393.

Segall, C.A. et al., "Pre- and post-processing algorithms for compressed video enhancement," Proc. of the Asilomar Conference on Signals and Systems, Oct. 2000, pp. 1369-1373.

Society of Motion Picture and Television Engineers, High Dynamic Range Electro-Optical Transfer Function of Mastering Reference Displays, ST 2084, 2014, 14 pages.

Topiwala, P. et al., "FVPIO: Enhancements of VPX for SDR/HDR Applications," SPIE International Conference, Aug. 2016, 13 pages.

Topiwala, P. et al., "New Invertible Integer Color Transforms Based on Lifting Steps and Coding of 4:4:4 Video," Joint Video Team (JVT) of ISO/IEC MPEG & ITU-T VCEG (ISO/IEC JTC1/SC29/WG11 and ITU-T SG16 Q.6), JVT-I015r3, Sep. 2-5, 2003, pp. 1-16.

Tran, T.D. et al., "Lapped transform via time-domain pre- and post-filtering," IEEE Transaction on Signal Processing, Jun. 2003, vol. 51, No. 6, pp. 1557-1571.

Tran, T.D. et al., "Lapped transform via time-domain pre- and post-processing," Conference on Information Science and Systems, Mar. 21, 2001, pp. 890-895.

Tran, T.D. et al., "Advanced Dyadic Spatial Re-sampling Filters for SVC," Joint Video Team (JVT) of ISO/IEC MPEG & ITU-T VCEG (ISO/IEC JTC1/SC29/WG11 and ITU-T SG16 Q.6), JVT-V031, Jan. 13-19, 2007, pp. 1-7.

Tran, T.D. et al., "Advanced Extended Spatial Re-sampling Filters for SVC," Joint Video Team (JVT) of ISO/IEC MPEG & ITU-T VCEG (ISO/IEC JTC1/SC29/WG11 and ITU-TSG16 Q.6, JVT-V030, Jan. 13-19, 2007, pp. 1-8.

Tran, T.D. et al., "High-Performance Low-Complexity Re-sampling Filters for SVC," Joint Video Team (JVT of ISO/IEC MPEG & ITU-T VCEG (ISO/IEC JTC1/SC29/WG11 and ITU-T SG16 Q.6, JVT-TO41r2, Jul. 15-Jul. 21, 2006, pp. 1-8.

Tran, T.D. et al., "High-Performance Low-Complexity Resampling Filters for SVC," Joint Video Team (JVT) of ISO/IEC MPEG & ITU-T VCEG (ISO/IEC JTC1/SC29/WG11 and ITU-T SG16 Q.6), JT-S020, Mar. 31-Apr. 7, 2006, pp. 1-7.

Vetterli, M. et al., "Wavelets and Subband Coding," Prentice Hall, Englewood Cliffs, NJ, 1995, (Title Page, Cover Page and TOC), 9 pages.

Dai, W et al., "AHG7: 4:4:4 Lite: A High-Level Syntax Approach to a Consumer 4:4:4 Codec," JCT-VC of ITU-T SG16 WP3 and ISO/IEC JTC1 /SC29/WG11, Geneva, CH, Jan. 14-23, 2013, nine pages.

Goris, R. et al., "Philips Response to CfE for HDR and WCG," ISO/IEC JTC1/SC29/WG11 MPEG2015/M36266, Warsaw, PL, Jul. 2015, 16 pages.

International Telecommunication Union, "Image Parameter Values for High Dynamic Range Television for Use in Production and International Programme Exchange," Jul. 2016, 17 pages.

International Telecommunication Union, "Parameter Values for Ultra-High Definition Television Systems for Production and International Programme Exchange," Oct. 2015, eight pages.

Kim, H.M. et al., "A New Color Transform for RGB Coding," 2004 International Conference on Image Processing (ICIP), 2004, pp. 107-110.

Le Leannec, F. et al., "Modulation Channel Information SEI Message," JCT-VC of ITU-T SG 16 WP 3 and ISO/IEC JTC 1/SC 29/WG 11, Sapporo, JP, Jun. 30-Jul. 9 2014, 13 pages.

Le Leannec, F. et al., "Usage of Modulation Channel for High Bit-Depth and Floating Point Signal Encoding," JCT-VC of ITU-T SG 16 WP 3 and ISO/IEC JTC 1/SC 29/WG 11, Sapporo, JP, Jun. 30-Jul. 9, 2014, 12 pages.

Luthra, A. et al., "AHG on HDR and WCG," ISO/IEC JTC1/SC29/WG11 MPEG2014/M33622, Sapporo, JP, Jul. 2014, 37 pages.

Luthra, A. et al., "Call for Evidence (CfE) for HDR and WCG Video Coding," ISO/IEC JTC1/SC29/WG11 MPEG2014/N15083, Geneva, CH, Feb. 2015, 46 pages.

Miller, S. "A Perceptual EOTF for Extended Dynamic Range Imagery," SMPTE Monthly Webcast, 2014, 17 pages.

Minoo, K. et al., "Description of the Reshaper Parameters Dervication Process in ETM Reference Software," JCT-VC of ITU-T SG 16 WP 3 and ISO/IEC JTC 1/SC 29/WG 11, San Diego, USA, Feb. 19-26, 2016, 17 pages.

Topiwala, P. et al., "HDR CE5: report of Experiment 5.3.2," JCT-VC of ITU-T SG 16 WP 3 and ISO/IEC JTC 1 /SC 29/WG 11, San Diego, USA, Feb. 19-26, 2016, eight pages.

Van Der Vleuten, R. et al., Proposed Electro-Optical Transfer Function (EOTF) for High Dynamic Range (HDR) Video Delivery, ISO/IEC JTC1/SC29/WG11 MPEG2014/M34274, Sapporo, JP, Jul. 2014, three pages.

* cited by examiner

ENHANCEMENTS OF THE AV1 VIDEO CODEC

CROSS-REFERENCE TO RELATED APPLICATION

This application claims priority under 35 U.S.C. § 119(e) from U.S. Provisional Patent Application No. 62/377,311 entitled "Enhancements of VPX for SDR/HDR Applications" filed on Aug. 19, 2016, which is incorporated by reference herein in its entirety.

BACKGROUND

The disclosure generally relates to the field of image and video compression, and more specifically to enhancements of the formative AV1 video codec, created by the Alliance for Open Media (aomedia.org), for the coding of digital images and videos.

A modern video codec, of which AV1 is our key example, has a variety of capabilities and uses. Among these are image coding, and video coding. The first frame of a video, having no prior information, must be coded independently (thus treated as an image); and due to a desire to be able to access any point in the video for later playback (called random access), additional independently coded frames (called I-frames or keyframes) must be placed regularly within a video stream (typically once every second of video). Moreover, even in predicted frames, various blocks within them may still be coded as intra blocks (I-blocks). These so-called I-frames and I-blocks thus typically make up a large fraction of the total video stream, and major advances in recent video codecs (e.g., AVC, HEVC, AV1) have been specifically in improving just the image coding capabilities of the video codec. We note further that, based on evidence recently available, the AV1 codec is relatively deficient in its image coding capabilities, relative to other major recent video codecs.

Among the challenges faced in video transmission is the time variability of available bandwidth of the network channel. A variety of tools and methods have been developed to address this issue. One tool that AV1 incorporates for this is the ability to scale down the resolution of the video at encoding and transmission, and scale it back up at reception/decoding. But the tools currently available in AV1 for scaling operations are suboptimal.

Among the various new applications involving video services in recent years is High Dynamic Range (HDR) video. Such video utilizes a wider range of both signal intensity, and color space, than ordinary (Standard Dynamic Range) video. For example, image/video data conforming to the ITU-R Rec. BT.709 standard may represent luminosity up to 100 nits, and include values of color components in a red-green-blue (RGB) color space. Recent interests in the broadcast and related video communications industry have turned to high dynamic range image/video data that may represent imagery at much higher levels of luminosity, of at least 1,000 nits and potentially up to 10,000 nits, and with a much wider color gamut, given by the BT.2020 standard. While AV1 does support higher bitdepth image/video (up to 10 and 12 bits), it has no specific tools and capabilities for effectively coding, transmitting, and displaying such image/video content.

Developing a dedicated encoding and decoding process for high dynamic range image/video data may be cost inefficient. In addition, such dedicated encoding and decoding process may not be compatible with standard dynamic range image/video data. A simple rescaling (or lowering) of a dynamic range in an attempt to utilize a conventional encoding and decoding process for standard dynamic range image/video data conforming to the conventional standard (e.g., ITU-R Rec. BT.709) may not be a viable solution. Assuming for an example, converting image/video data capable of representing up to luminance of 1000 nits into 100 nits can be simply performed by dividing all samples by 10. However, such an approach may entail a loss of artistic intent or artistic details of the image/video thereby degrading a quality of the image/video presented. How to regrade an image/video from one dynamic range to another while maintaining artistic intent or details is a challenging process.

Therefore, the high dynamic range image/video data having a higher dynamic range compared to the standard dynamic range image/video data cannot be processed in an efficient manner through a conventional encoding and decoding approach.

SUMMARY OF THE INVENTION

This invention provides a variety of mechanisms for enhancing the performance of the AV1 and related codecs, in several directions. (Since AV1 is a still developing codec, for specificity, we work with AV1 version 0.1.0, retrieved July, 2017 from aomedia.org). One or more embodiments of the invention aim to enhance the image coding performance of AV1. This directly relates also to the coding of I-frames and I-blocks within the video codec. One or more embodiments of the invention aim to enhance the resilience of AV1 under conditions of varying channel bandwidth, by allowing for explicitly scaling the resolution of video imagery prior to coding and transmission, and rescaling the video imagery prior to display upon reception. And one or more embodiments of the invention aim to address the coding of HDR image/video data, by incorporating specific tools tailored to this data type.

One or more embodiments of the invention relate to the incorporation of advanced, integer, invertible transforms in the design of the intra-coding structure of AV1. These include (overlapped) block-based transforms, in a variety of sizes (e.g., 4-32 for AV1), which may be implemented with fast, invertible lifting steps.

One or more embodiments of the invention relate to the incorporation of advanced video scaling techniques in the design of the predictive coding structure of AV1, for use in scaling the video imagery in response to adverse channel conditions. These include methods of downsampling and upsampling that are co-designed to have optimal signal preservation in their concatenated use.

One or more embodiments of the invention relate to the incorporation of advanced methods for dynamic regrading of image/video, which can alter the dynamic range arbitrarily, both in intensity and color space, for example from high to standard (or the reverse) as desired. These include methods for efficiently coding HDR image/video using the core structure of existing video coding/decoding architectures, while also providing for backward compatibility capabilities with standard dynamic range (SDR) video services.

BRIEF DESCRIPTION OF THE DRAWINGS

FIG. 4 is a block diagram of an image/video communication system according to one embodiment.

DETAILED DESCRIPTION

Figure 1A:
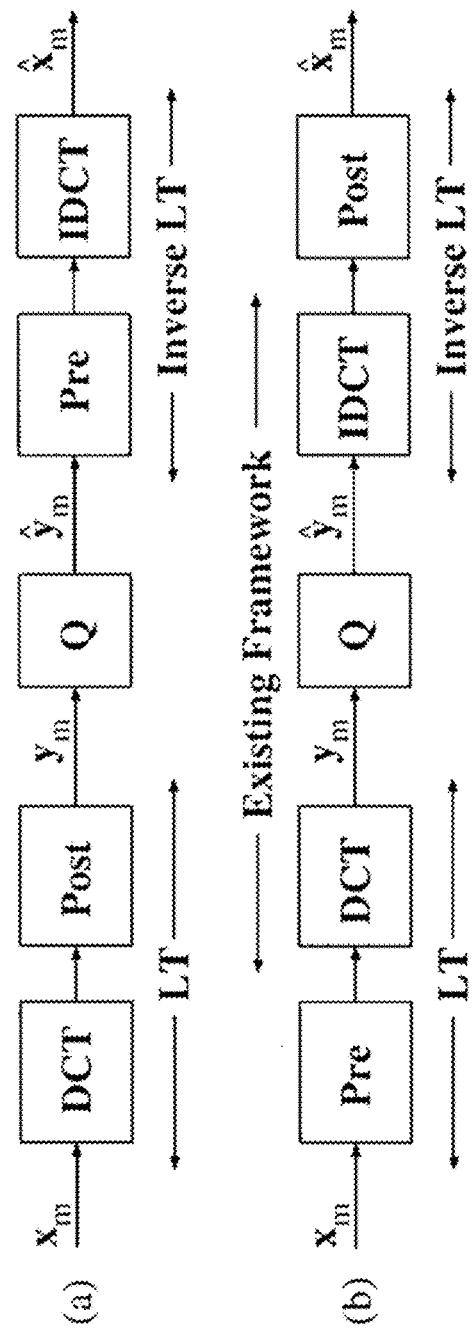
FIG. 1A illustrates two approaches to developing lapped transforms in terms of pre/post filters relative to DCT and IDCT. In 1A(a), the filters are post the DCT at the encoder, and pre- the IDCT at the decoder, an approach we call LiftLT. In 1A(b), the filters are pre- the DCT at the encoder, and post the IDCT at the decoder, an approach we call FastLT. While this method may not be able to represent all lapped transforms, its key advantage is that it is fully outside an existing codec, implementable with pre- and post filters by design. We develop this approach in this invention.

The figures and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures. It is noted that wherever practicable similar or like reference numbers may be used in the figures to indicate similar or like functionality. Furthermore, while this invention strives to make enhancements on the emerging AV1 codec, the same invention applies to a broad class of image/video coding technologies including WebP, VP9, AV1, and codecs developed by the Alliance for Open Media (aomedia.org), as well as AVC, HEVC, JVET, and codecs developed by the ITU-T/VCEG, ISO/IEC MPEG, and ISO/IEC JPEG Committees. Discussion of AV1 as a specific example does not limit the breadth of application, nor the scope of claims.

As mentioned, embodiments of our inventions relate to extending the capabilities of AV1 in at least three directions. In image or I-frame coding, we add new lapped transforms (LTs) of a type we call FastLT. In channel variation adaptation, we add capabilities in encode-time resampling of the signal using resampling filters from a family we call FastRS. In coding high dynamic range (HDR) signals, we introduce a method we call FastHDR, which converts HDR signals into standard dynamic range (SDR) signals, which can be coded by existing codecs. All of these techniques will be developed in the sequel.

This disclosure builds upon the following concepts described in the following patents/patent applications: (a) signal transforms, U.S. RE40081, "Fast Signal Transforms Using Lifting Steps," and U.S. Pat. No. 8,548,265, "Fast Multiplierless Integer Invertible Transforms;" (b) resampling filters, U.S. Pat. No. 8,155,462, "Master Reconstruction Schemes for Pyramid Decomposition;" (c) adaptive coding and transmission, U.S. Pat. No. 9,609,336, "Adaptive Coding, Transmission, and Efficient Display (ACTED);" (d) superresolution, U.S. Pat. No. 8,520,736, "Real-Time Superresolution and Video Transmission;" (e) HDR coding, US 2016/0360212, "High Dynamic Range Image/Video Coding;" and (f) motion estimation, U.S. Pat. No. 8,913,660, "Device and Method for Fast Block-Matching Motion Estimation," and U.S. Pat. No. 8,428,135, "Fast Sub Sample Block-Matching Motion Estimation," each of which (patent/patent application) is hereby incorporated by reference in its entirety.

Image/Intra Coding

Lapped Biorthogonal Transforms

While image and video codecs are certainly related, video coding actually relies in a fundamental way on image coding. Block-based coding has been the method of choice in digital image and video compression for decades: data is partitioned and processed in small local blocks. Unfortunately, the main disadvantage of previous block-based coding approaches is their ungraceful degradation at low bit rates. Coding efficiency suffers since inter-block correlation has not been taken full advantage of. This problem is magnified at low bit rate situations: discontinuities at block boundaries resulting from reconstruction mismatches create visually-annoying blocking artifacts. Many techniques have been developed to improve coding efficiency and to avoid or reduce blocking artifacts in DCT based block coding systems. Most can be classified into two distinct categories: (i) using an overlapped transform instead of the DCT; (ii) using pre- and post-processing techniques. The following papers are central to our invention, and are incorporated herein in their entirety: T. Tran et al, "Lapped transform via time-domain pre- and post-filtering," IEEE Transaction on Signal Processing, vol. 51, pp. 1557-1571, June 2003 (Tran et al); and W. Dai and T. D. Tran, "Regularity-constrained pre- and post-filtering for block dct based systems," IEEE Trans. on Signal Processing, vol. 51, pp. 2568-2581, October 2003 (Dai/Tran).

Algorithms in the first approach improve reconstruction quality by employing either the wavelet transform or the lapped transform (LT) in signal decomposition and reconstruction. In the second approach, pre- or post-processing techniques have been proposed to improve reconstruction quality while maintaining compliance to standards. Both classes of algorithms share one common goal: to eliminate or reduce the severity of coding artifacts in the reconstructed signal. While effective, the first method essentially involves additional transforms, which is complicated and undesirable to introduce into an existing codec such as AV1. On the other hand, the existing pre- or post-filtering techniques tend to lack a strong rate-distortion foundation; pre- and post-processing are mostly treated separately; and they usually distort the original signal contents. This makes the application of such technology within an existing codec also problematic.

Figure 1B:
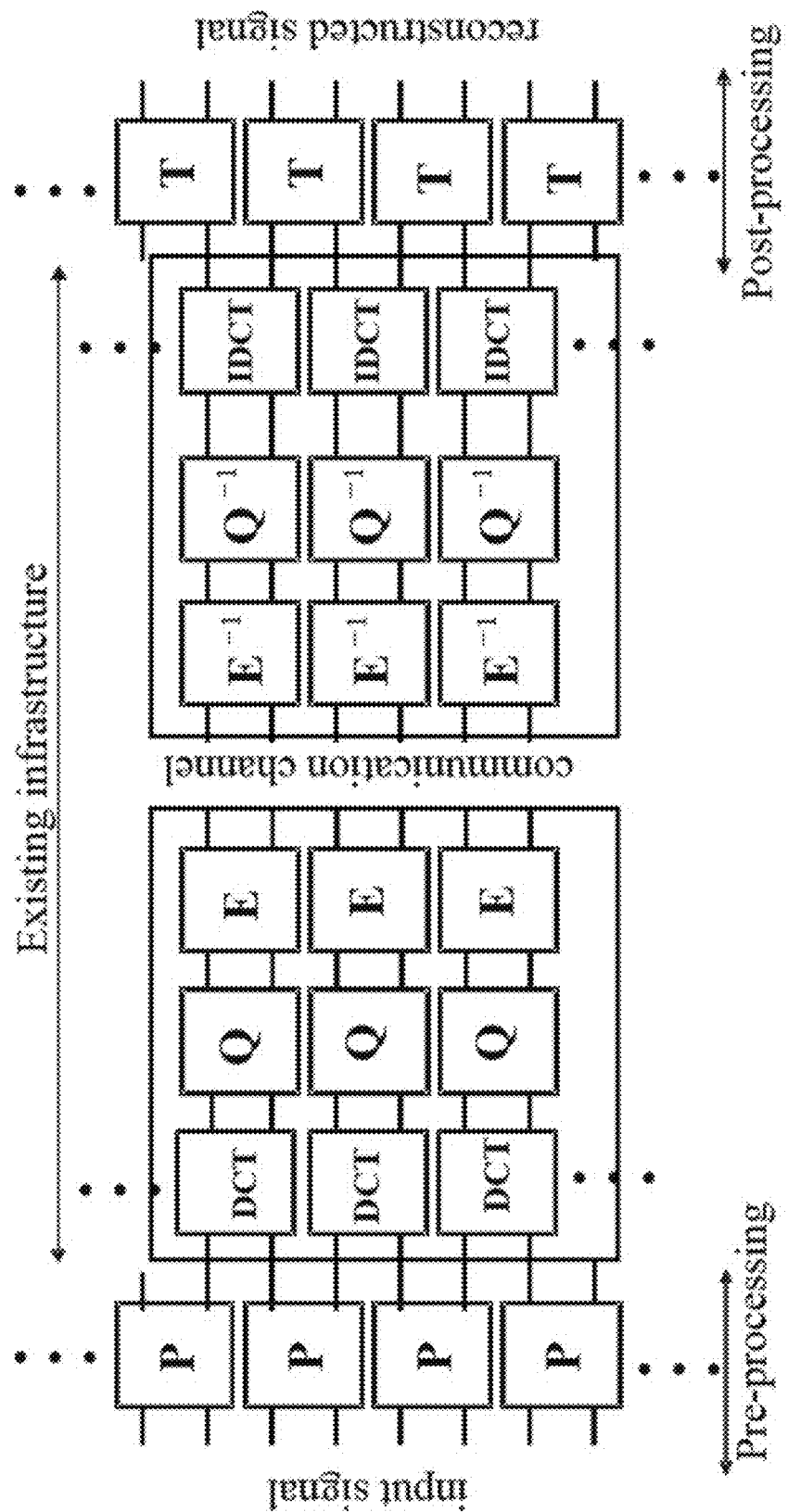
FIG. 1B illustrates the general structure of pre- and post-filters, showing that by design we require the pre- and post-filters to stride blocks of DCTs/IDCTs.
Figure 1C:
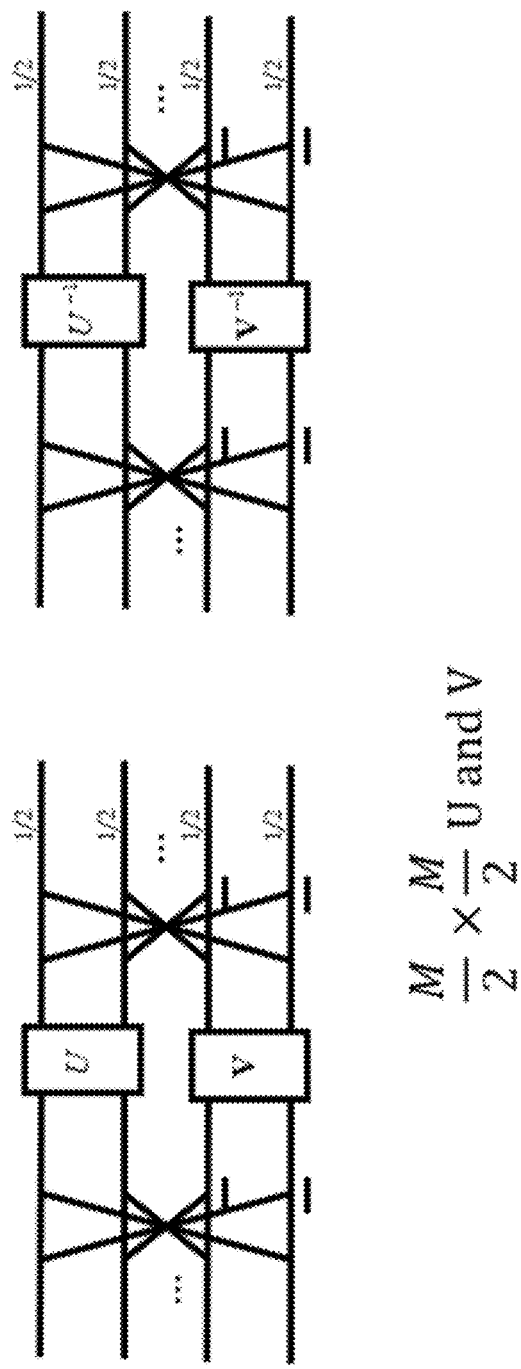
FIG. 1C illustrates a special case of the general design in FIG. 1B, in which the prefilter P and postfilter T have a specific decomposition in terms of butterflies and sandwiched block matrices. Note that the block matrices in T are just the inverse of the ones in P.
Figure 1D:
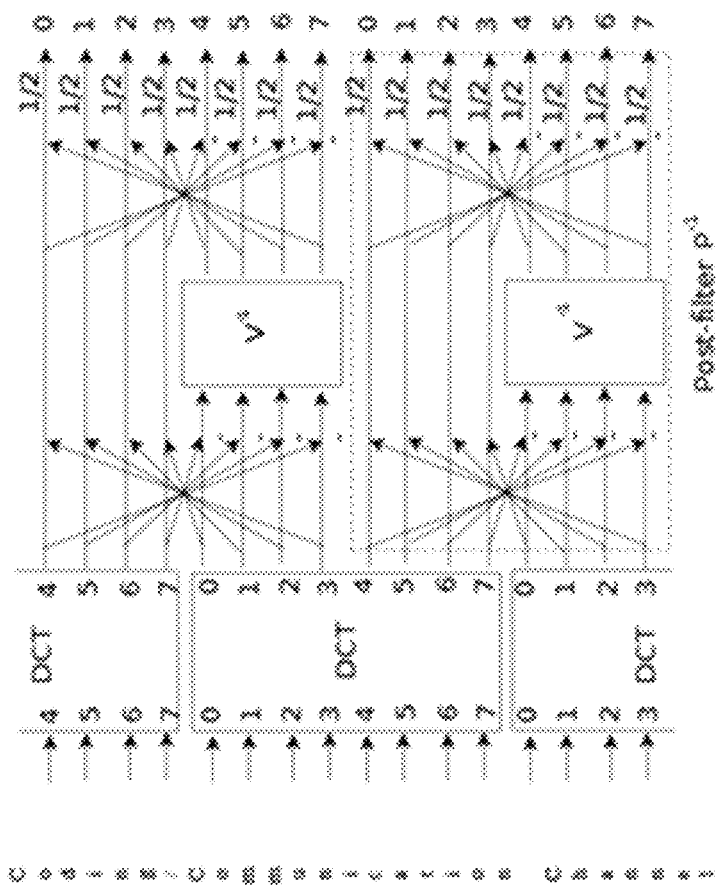
FIG. 1D illustrates a further special case of FIG. 1C, in which the upper matrix U is selected to be the identity. Remarkably, this special case already yields very useful designs, and will be the focus of our development.
Figure 1D:
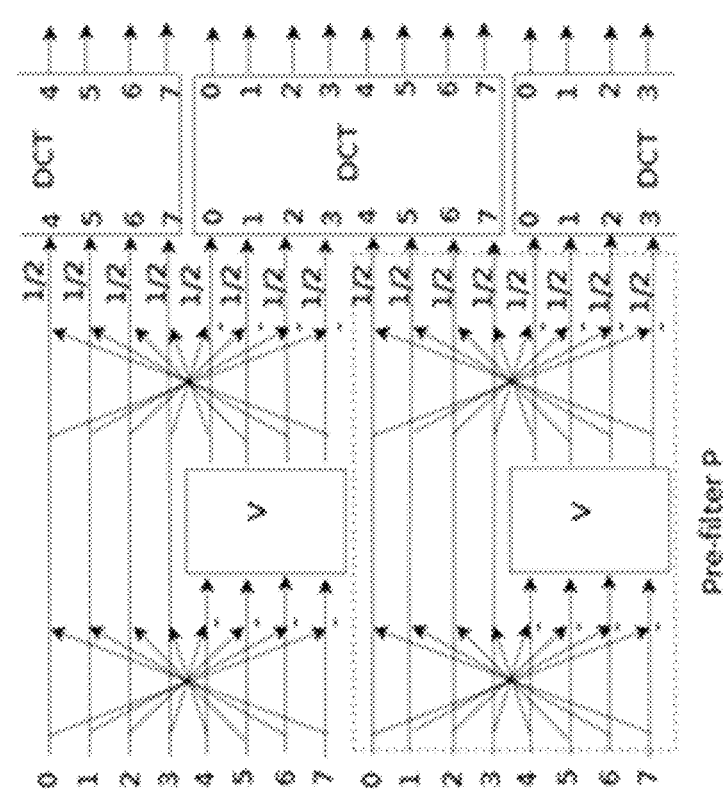

A key part of this invention is in how to incorporate the formalism of lapped transforms for effective use within the AV1 video codec. As explored in Tran et al, lapped transforms can be developed as either postprocessing to a DCT and preprocessing to IDCT (a method we call LiftLT), or the reverse: preprocessing to the DCT in the encoder, and postprocessing to the IDCT in the decoder (what we herein call FastLT). The LiftLT case was explored in U.S. RE40081. We explore special cases of FastLT in the sequel. This is depicted in the figures, where FIG. 1A depicts the two approaches to lapped transforms via pre/post filters, (a) LiftLT, and (b) FastLT. FIG. 1B illustrates the general form of the FastLT approach, showing that the pre- and post-filters sit astride the DCTs/IDCTs in the design. FIG. 1B shows a special case where the pre/post filters have a specific type of factorization. FIG. 1D shows a further special case, in which the matrix U in the upper half is set to Identity, simplifying the design. In the sequel, we pursue this special case further.

Through a series of elementary matrix manipulations, a large class of lapped transforms can be in fact be constructed as a combination of pre- and post-filtering, reutilizing the current block-based DCT framework. This is convenient for inclusion of such a lapped transforms framework within an existing video codec, such as AV1, which already has DCT transforms of various sizes (4-32 point) within its architecture. Tran et al and Dai/Tran have found a general closed-form M-point pre- and post-filtering operators P and T that work well with block DCT of size M or larger in the general framework shown in FIG. 1. The pre- and post-processing operators are placed at each block boundary. Unlike most existing pre- and post-processing approaches, the pre- and post-filter in our framework are intimately related. In fact, they are the exact inverses of each other, i.e., $T=P^{-1}$, thus perfect reconstruction can be structurally guaranteed. Further study reveals that linear phase basis functions can also be structurally imposed. This general closed from pre- and post-filtering is shown in FIG. 1. At the encoder side, the pre-filter P processes the block boundaries, extracting inter-block correlation. The pre-processed samples are then fed to the DCT to be transformed and encoded as usual. At the decoder side, $P^{-1}$ serves as the post-filter, matching the signal from two sides of the block boundaries and eliminating blocking artifacts.

This general closed form pre- and post-filtering framework has a lot of advantages:

Existing block-based infrastructure can be kept intact.

Coding efficiency is improved by taking into account inter-block spatial correlation in the pre-filtering stage.

Blocking artifacts are eliminated with post-filtering along the block boundaries while ringing artifacts can be controlled by varying the number of overlapping samples.

Perfect reconstruction and linear phase basis functions can be structurally guaranteed.

Pre- and post-filters are constructed in modular cascaded stages, leading to minimal hardware/software modifications and simple future upgrades.

Pre- and post-processing retain all flexible features of block-based approaches and add on top a high level of adaptivity in signal decomposition.

In the pre- and post-filtering framework, the pre-filter acts as a flattening operator. It attempts to make the input to the DCT as homogeneous as possible; hence, improving the overall energy compaction. This is quite consistent with most pre-filtering schemes in practice: smoothing the input signal improves coding efficiency. In our framework, high-frequency signal components are never eliminated; they are only slightly shifted in space. In other words, we take full advantages of the block-based framework by carefully aligning high-frequency components at block boundaries. Discontinuities between DCT blocks, i.e., actual high-frequency contents, do not affect coding performance whereas, within each block, data samples are smoothened out, enhancing the DCT's effectiveness in energy compaction.

It is easy to prove that perfect reconstruction is structurally guaranteed. The matrix V controls the pre- and post-filters. A family of orthogonal or biorthogonal implementations can be generated by simply varying the matrix V. If V is chosen to be orthogonal, the implementation is equivalent to a lapped orthogonal transform. V can be easily modified to construct a lapped biorthogonal transform. Below, we will outline a computational framework of developing matrices V, and thus, the desired lapped biorthogonal transforms.

Figure 2A:
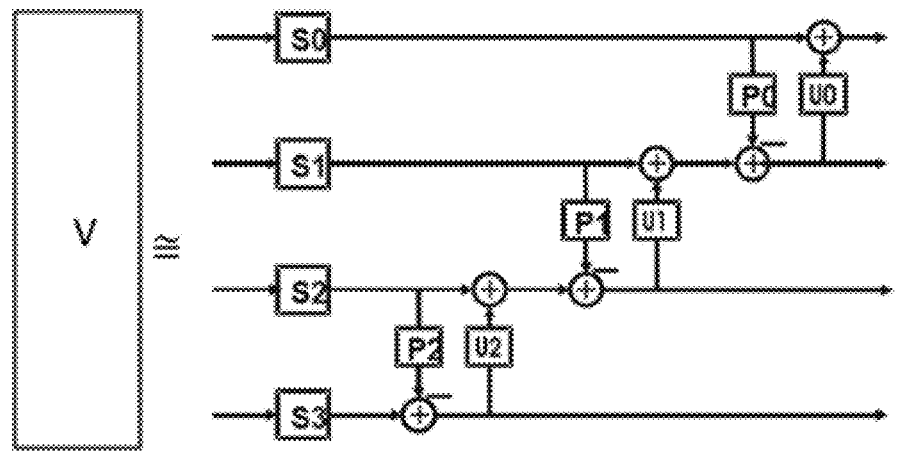
FIG. 2A is a block diagram of an image/video communication system based on a Type-III model, according to one embodiment, and a special case of FIG. 1D.
Figure 2B:
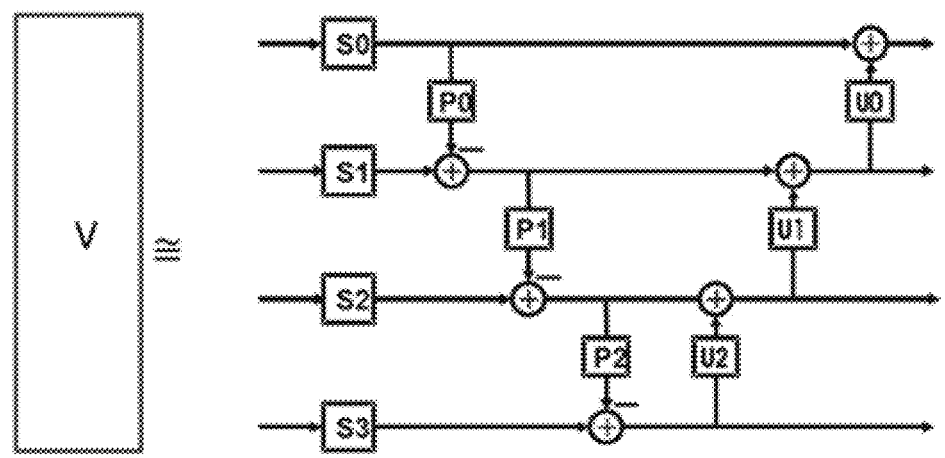
FIG. 2B is a block diagram of an image/video communication system based on a Type-IV model, according to one embodiment, and a special case of FIG. 1D.
Figure 3A:
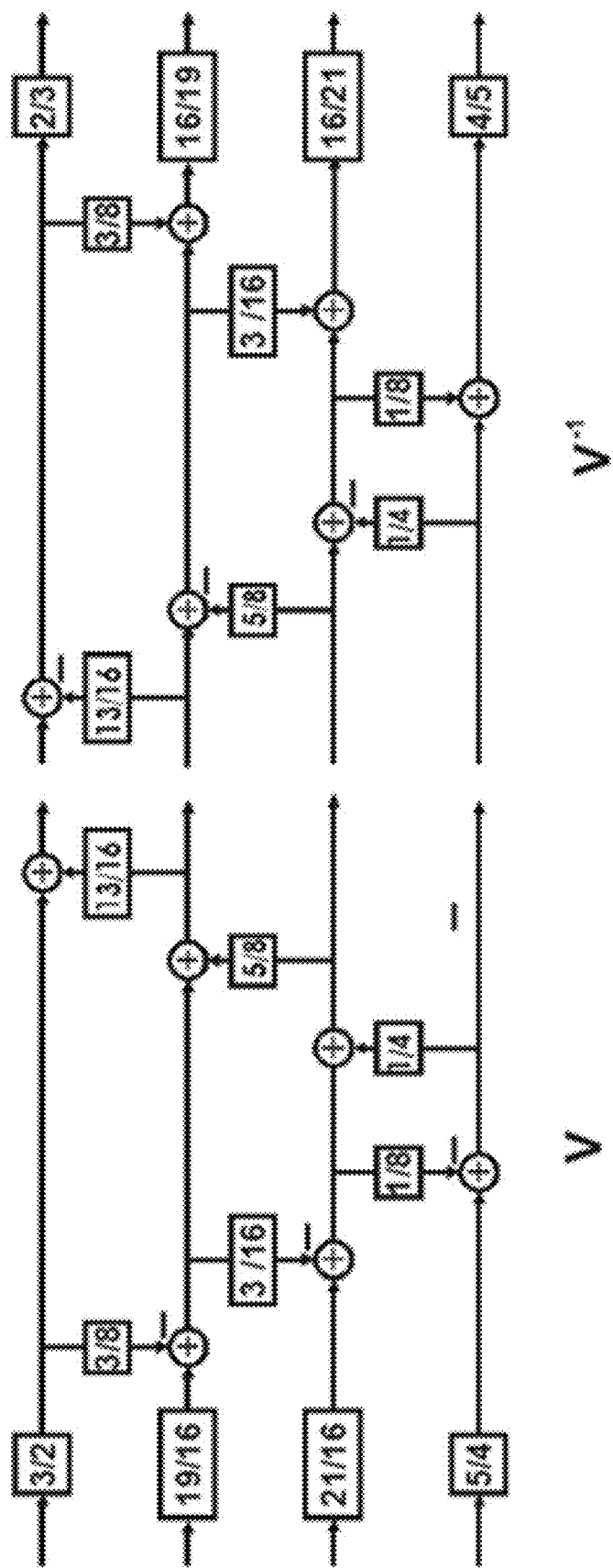
FIG. 3A shows an example of a specific lifting based implementation of V, according to one embodiment.

Most image/video codecs are capable of performing fast DCT and related computations by using few multiplications, and using integer or even rational coefficients. It is very important to note that the framework in FIG. 1 can also have fast implementations. It is well known that butterflies in the pre-filter can be implemented using the lifting structure. Our main concern is analyzing the matrix V. Tran et al showed that V can also be constructed using lifting structures as shown in FIGS. 2A and 2B. FIG. 3A shows an example of a lifting based implementation of V, according to one embodiment.

As mentioned, we explore herein the special case that between the two full butterflies, there is on a single matrix V in the lower half of the channels (upper half is identity). That is not the general case of FastLT design is more complicated; for example, there can be another matrix U in the upper half as well, with similar decompositions. In any case, we clarify again that the FastLT design uses prefilters to the DCT at the encoder, and postfilters to the IDCT at the decoder, which differs from the LiftLT design as exposed in U.S. RE40081, which has postfilters to the DCT, and prefilters to the IDCT. For details of this distinction, see the Tran et al. reference.

With the FastLT design in hand, one can begin the task of actually inserting this technology into a modern codec. This is complicated. For example, for AV1, in in addition to the numerous DCT/DST based block transforms already in the AV1 library, we can develop a variety of coding approaches. However, just as an example of the impact of this significant tool addition, we first focus on only one application: very high-quality image coding. We can design a very high-quality image codec by turning off all prediction modes, and applying only transforms, quantization, and entropy coding (that is, an All Intra mode approach, with even Intra prediction turned off). Note that for ultra-high quality, all prediction modes, even Intra prediction, can lead to occasional degradations that are unacceptable, which is why they are turned off.

In general, we need a much more sophisticated insertion approach into a modern video codec, such as AV1, which is assumed to have DCT block transforms already in the design (for certain block sizes; for AV1, these are 4-32 pt transforms). As a preliminary, note that the input to an image codec is an image, while the input to a video codec may be an image frame or a predicted frame (which has different statistics than an image frame). We will refer generically to such an input as a signal data frame. Such a frame may be divided into blocks in a variety of ways, for further processing (by predictors, transforms, quantizers, and entropy coders, for example). Now, in introducing additional transform capabilities into an image/video codec, one can, in general, allow a rate distortion optimization (RDO) algorithm decide which transforms to use in a particular instance. But in some cases, such an RDO algorithm may be undesirable (for reasons of complexity, for example), and another decision mechanism may be employed. In the following, for the purposes of outlining an explicit instance of our invention, we will assume that the data is presented in a luminance-chrominance decomposition (such as the commonly used Y'CbCr color space; we also sometimes refer to this as YUV, but there are many luminance-chrominance decompositions, some of FastVDO design that have advantages). If it is in another color space (for example in RGB), the data may be first converted to Y'CbCr by a linear color space transformation. Furthermore, at an encoder, there are many selection decisions that may be made by a rate distortion optimization (RDO) algorithm; but they can also be made by other methods, for example set by a formula, or frozen in the design.

With these remarks, our invention allows us to extend the capabilities of an existing image/video codec, to have two new modes, as follows:

At an image/video codec, having a capability to perform DCTs of one or more sizes, given an input data frame, and given a choice of quantization parameter Qp, a method of processing blocks of signal samples of the frame in which, based on a choice of an RDO or another selection method (such as by thresholds based on Qp), the blocks are processed according to one of the following new, enhanced modes 1. Mode 1 (LT only):
a. all predictors are turned off, including Intra predictors, in the encoder;
b. certain at least one size of DCT is selected to be enhanced with lapping;
c. for each selected size DCT, the data is preprocessed through prefilters before the DCT blocks in the encoder, said prefilters designed per our design method (FastLT);
d. for each selected size DCT, at the decoder part of the encoder, the data is postprocessed by postfilters after the IDCT blocks, said postfilters designed per our design method (FastLT), matching the prefilters;
e. at the encoder, after the DCT, the data is transformed further by DC prediction of the current block with respect to its neighboring blocks, whose coefficients are selected by an RDO or another method.

(DC(current)→DC(current)−½[DC(top block)+DC (left block)]. Example f. After transformation, the data is quantized, with the quantization on the chrominance components U, V, adjusted relative to the quantization on the luminance components, as follows: Qp,U, Qp,V→Qp+delQp. Here delQp is a parameter that is chosen by an RDO function, or another method. (Example default: delQp=0.5)
g. if more than one size of DCT is enhanced with lapping, an RDO or another method selects which LT transform coefficients to send forward in the encoder pipeline;
h. the selection of which transforms were used is indicated or otherwise deducible in the bitstream;

2. Mode 2 (Mixed), a. the data blocks are processed by any combination of DCTs and LTs, as selected by an RDO or another method, where a certain number of the pre- and post filters may be turned off, and the transforms reverted to existing DCTs;
b. The DC prediction step may be selected or skipped by an RDO or another method (default example: off);
c. the quantization parameter may be adjusted for the chrominance components relative to the luminance components by an amount delQp, as selected by an RDO or another method;
d. the selection of which transforms were used is indicated or otherwise deducible in the bitstream.

Experiments

Images (YUV 4:4:4 8/10-bit HD 1080p and above) are encoded to achieve various compression ratios (CR) using the existing tools in the AV1 library. Objective quality testing is done by computing overall PSNR between compressed and original images, at the different compression ratios. Both single cycle encoding/decoding experiment (encode & decode once at 4:1, 6:1 and 8:1 CR) and multiple cycle encoding/decoding experiment (3 cycles of encode & decode at 6:1 CR) is performed to record the performance of the tool in one cycle and the PSNR degradation observed during multiple cycles. This will be used as reference. The tests are repeated with the modifications to the AV1 library. In Tables 1 & 2 the PSNR gain obtained in dB is recorded for some 8/10 bit images from JPEG test data.

TABLE 1

|  | Gain (dB) | | |
| --- | --- | --- | --- |
| Sequences | CR 6:1 | CR 9:1 | CR 12:1 |
| APPLE_BasketBallScreen_2560x1440p_8b | 0.68 | 0.44 | 0.32 |
| FemaleStripedHorseFly_1920x1080p_8b | 0.41 | 0.26 | 0.2 |
| FHG_JPEGPlenoSet2_3840x2160p_8b | 0.79 | 0.54 | 0.48 |
| RICHTER_ScreenContent_4096x2160p_8b | 0.75 | 0.69 | 0.58 |
| ARRI_AlexaDrums_3840x2160p_10b | 1.33 | 0.8 | 0.52 |
| ARRI_AlexaHelicopterView_3840x2160p_10b | 1.13 | 0.96 | 0.76 |
| BLENDER_Sintel2_4096x1744p_10b | 1.28 | 1.15 | 0.84 |
| EBU_04_Hurdles_1920x1080p_10b | 1.02 | 0.97 | 0.81 |
| Average | 0.92375 | 0.72625 | 0.56375 |

TABLE 2

| Sequences | Gain (dB) CR 6:1 |
| --- | --- |
| BalloonFestival | 1.154 |
| Bike_Cut1 | 0.815 |
| EBU_04_Hurdles | 0.979 |
| EBU_CPS_Starting | 1.076 |
| Market | 1.168 |
| ShowGirl | 1.263 |
| Sunrise | 1.031 |
| Warm | 0.809 |
| Average | 1.036875 |

In Table 3 average gain obtained when compared to Xiph's experimental encoder library (Daala codec), May 2017 version, and ProRes 444 (ffmpeg version) for 6:1 CR are tabulated. From the tables 1-3 it is evident that the approach proposed in this paper gives consistent gains over various image codecs. Moreover, for 10-bit content, the gains are consistently above 1 dB.

TABLE 3

|  | JPEG2000 | VC2 | ProRes (ffmpeg version) |
| --- | --- | --- | --- |
| Average Gain(dB) | 2.5835 | 1.0635 | 2.685 |

Method of Creating Lapped Transforms of any Size

The method is actually quite general. An iterative method of developing efficient, integer, reversible lapped transforms of any desirable size, as a combination of (a) lifting steps, (b) scale factors, and (c)+/−butterfly steps, is briefly explained as follows. This relies on a sequence of mathematical facts that, while individually known in the prior art, were first used by FastVDO in creating effective, efficient, invertible lapped transforms using lifting steps. Each of the following theorems quoted from the literature in fact has a computational algorithm for realizing them explicitly.

1. In constructing a lapped transform by the method of pre/post filter on the DCT, one needs to create a matrix V as described earlier. A general factorization for V with desired characteristics is available in our cited references. It is then a matter of developing a fast, integer, lifting based implementation of V. The same methodology herein applies to any matrix that is given explicitly in real or complex coefficients (such as DCT, DST, . . . ), and a fast, lifting approximation is sought.
2. By the Singular Value Decomposition, any mxn real or complex matrix A can be decomposed as a product XDY, where X is mxm unitary, Y is nxn unitary, and D is diagonal. When A is real, so are X, D, and Y (real unitary=orthogonal). The diagonal matrix D consists of scale factors. It remains to simplify the X, Y.
3. By the Givens Decomposition, any real unitary (orthogonal) matrix can be factorized as a product of 2D rotations, and reflections (one reflection if det=−1, none if det=1).
4. A real 2D rotation can be factorized into a product of 3 shears, or lifting steps.

$$\begin{bmatrix} \cos(\alpha) & -\sin(\alpha) \\ \sin(\alpha) & \cos(\alpha) \end{bmatrix} = \begin{bmatrix} 1 & p \\ 0 & 1 \end{bmatrix} \begin{bmatrix} 1 & 0 \\ u & 1 \end{bmatrix} \begin{bmatrix} 1 & p \\ 0 & 1 \end{bmatrix}$$

where $p=(\cos(\alpha)-1)/\sin(\alpha)$, and $u=\sin(\alpha)$.

5. While in general the coefficients of both the lifting steps and the scale factors are real numbers so far, by the density of dyadic rational numbers in the real number system, an approximation to arbitrary accuracy may be chosen in which all coefficients are dyadic rational numbers. And a matrix in which all coefficients can be approximated to arbitrary accuracy can itself be approximated to arbitrary accuracy in the general linear group GL(n) by matrices with entries in dyadic rationals. Such an implementation then permits execution by add and shift operations only.
6. A greedy search algorithm can be deployed to find very low complexity realizations with lifting steps and scale factors that are dyadic rationals. In essence, we utilize the decimal expansions of the real numbers to initiate search starting points, and search nearby dyadic rationals. We omit the details of the algorithm.
7. In our application, the DCTs are already available in the AV1 codec; we design suitable pre/post filters by the above method to create lifting based matrices V.

Real-Time Re Scaling

In applications such as streaming video over a network, one often encounters varying channel capacity, which may from time to time require reducing the bitrate of the stream. In extreme cases, it may be desirable to scale the resolution of the video down to achieve an acceptable quality of video, rescaled up at the receiver. Here we develop methods of improving the existing tools within AV1 to accomplish this.

Note that down- and upsampling have been studied for decades, and are well developed in the literature. The simplest technique for downsampling, say by a factor of 2 (the most common example), is to just keep every other sample of a signal. Similarly, in upsampling, one simply interjects zeros in between samples. The combination of the two actions results in a signal in which every other sample has been set to 0. This is generally an undesirable result, and definitely so in video resolution adaptation, as one wants to resultant signal to be reasonable close to the original signal. A key enabling technology in this field are well designed scaling filters, performed prior to simple downsampling and post simple upsampling data, that attempt to better preserve the signal information. Many are available; we cite our patent U.S. Pat. No. 8,155,462, and in particular, we note the development of specialized filters which satisfy certain optimality criteria (Optimal Laplace Pyramid Processing System, or OLaPPS). We also reference some of our many contributions to the joint ITUIISO/IEC Committees, especially the Joint Video Team (JVT) that we have submitted, in particular JVT-5020 (Geneva, C H, 2006-04), JVT-T041 (Klagenfurt, A T, 2006-07), JVT-V030 and JVT-V031 (Marrakech, Morocco, 2007-01).

This section extends ideas from the paper "FVP10: Enhancements of VPX for SDR/HDR Applications," by P. Topiwala et al., SPIE Int'l Conf., San Diego, Calif., August, 2016), which is hereby incorporated by reference herein in its entirety and is captured in the Provisional application of this patent. In the SPIE 2016 paper (and Provisional) we compared resampling filters in the VPX codebase, with FastVDO custom filters. As in VPX, AV1 encoders support spatial resampling (with such filters unchanged). Of course, sampling and interpolation filters are used in subpixel motion estimation. But we focus on another important application: adaptive resolution coding (ARC) (W. Dai, M. Krishnan, P. Topiwala, "Advanced Resampling Filters for Spatial Scalability and Chroma Sampling Applications in HEVC", ITU/ISO/IEC JCTVC-F618, JCTVC 6th Meeting, Turin, IT, 14-22 Jul. 2011; T. Davies and P. Topiwala, "AHG18: Adaptive Resolution Coding (ARC)," ITU/ISO/IEC JCTVC-G0264, Geneva, CH, November, 2011). Think of it as scalability-lite. It involves scaling down the frame resolution to a smaller size at the encoder in response to traffic in channel bandwidth and the subsequent scaling up to the original resolution at the decoder side. It is an important feature in streaming applications where limitations occur in channel bandwidth, and is in use with AV1. This paper concentrates on down/up resampling by a factor of two (the most commonly used case).

Resampling Filters

As in VP9/10, the AV1 software use the 8-tap filter: [−1, −3, 12, 56, 56, 12, −3, −1]/128 for downsampling to an even filtered length. For upsampling a set of 32 filters (corresponding to 32 phase positions) derived from an 8-tap filter: [−1, 6, −20, 79, 79, −20, 6, −1]/128 is used.

Figure 3B:
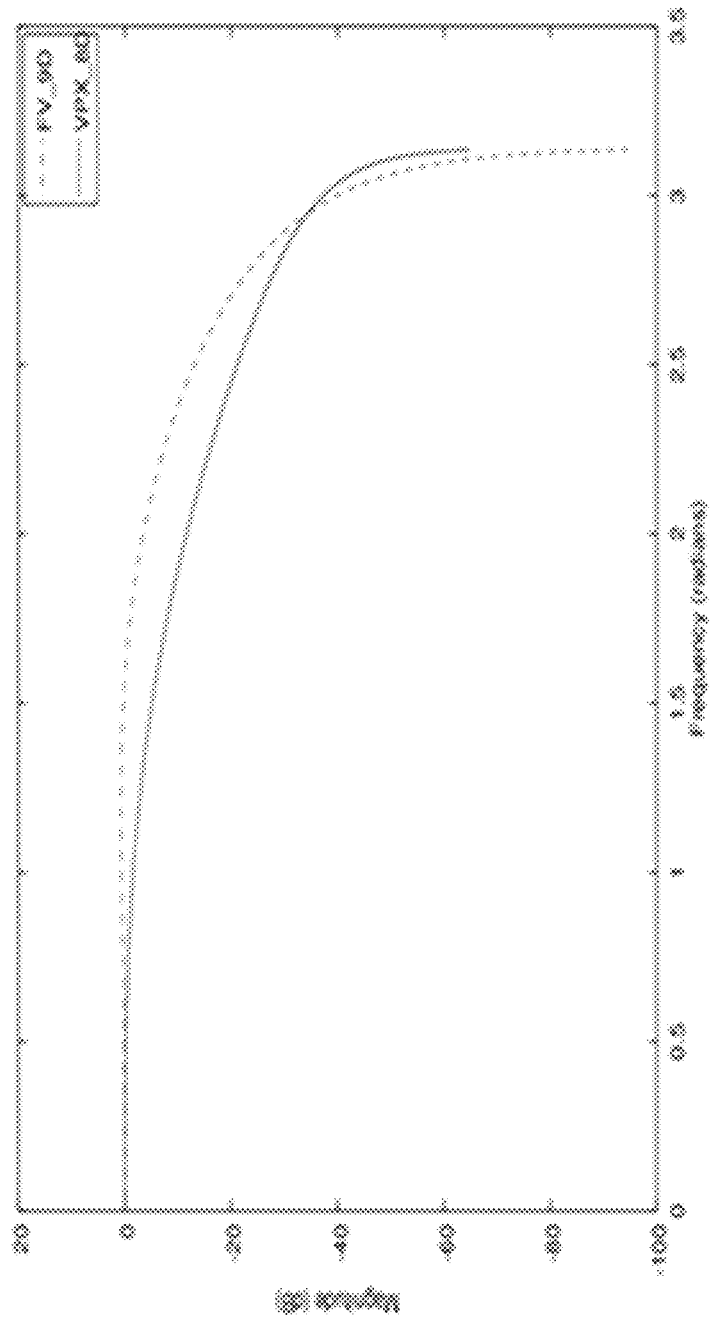
FIG. 3B shows the frequency response curves for the AV1 downsampling filter, and a proposed design according to an embodiment.
Figure 3C:
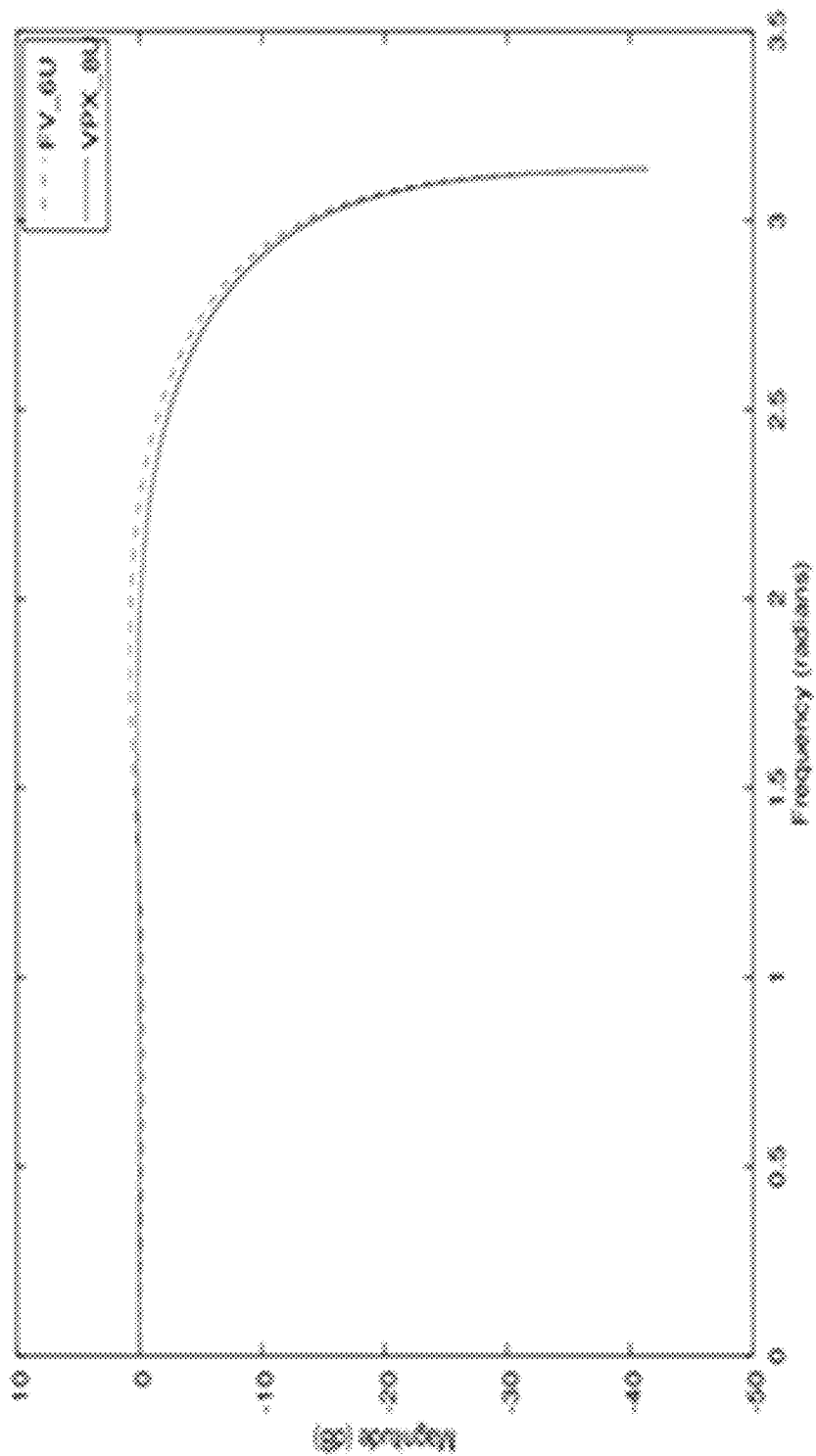
FIG. 3C shows the frequency response curves for the AV1 upsampling filter, and a proposed design according to an embodiment.

In this invention, we present some new FIR "nearly low-pass" filter designs for dyadic down-sampling and up-sampling filters, which, when properly co-designed, outperform the AV1 filters. The specific filter combination, and especially their polyphase extensions, is new to this invention, and has not been taught previously to our knowledge. The filters have their roots from the wavelet and spline interpolation theory which has long been established to have excellent interpolation characteristics. On the down-sampled side a 9-tap down-sampling filter that is designed to minimize aliasing artifacts in the sub-sampled images is used, and has its lineage among a family of filters we have described in U.S. Pat. No. 8,155,462 as Optimal Laplace Pyramid Processing System (OLaPPS). On the up-sampled side, a 6-tap dyadic symmetric filter derived from the family of interpolative splines called O-MOMS (optimal maximal-order minimal-support) designed for best least-square performances is used. FIGS. 3B and 3C plot the down & upsampling filters (AV1 filters in blue line, proposed in dashed red line) respectively. We will henceforth give a name, FastRS, to the set of filter pairs that can be selected from these OLaPPS and O-MOMs families (and related filters, by extracting polyphase versions of any of these filters).

For our application to video coding, especially for insertion into AV1, we had to meet several requirements: (1) keep the average implementation complexity at or below that of existing filters; (2) wherever polyphase filters are used (e.g., 32 phase for the upsampler in AV1), develop and use polyphase versions of our filters of the same type; (3) ensure that the coding performance of our filters meets or exceeds the performance of the existing filters in the video codec design.

Downsampling filters: Instead of optimizing the low-pass filter such that its frequency response has steep transition characteristics to match the ideal low-pass box filter, we opt for a smoother, slower-decaying frequency response. In general, we observe that filters which allow a little aliasing (to capture a bit more image information) seem to outperform filters with good anti-aliasing characteristics, and good wavelet-inspired filters tend to perform well here.

The filter proposed: [1, 0, −8, 16, 46, 16, −8, 0, 1]/64 is a 9-tap (computationally a 7-tap) dyadic-coefficient half-band filter designed to minimize aliasing effects in sub-sampled images. FIG. 3B (red dashed line) plots the magnitude response of the filter, which is compared to the frequency response of the 8-tap AV1 filter.

Upsampling filters: Generally, we found that filters with good anti-aliasing characteristics with smooth frequency responses (max-flat characteristic) tend to perform well in up-sampling. The proposed 6-tap filter: [2, −6, 20, 20, −6, 2]/32 is based on a family of spline functions named Maximal-Order Interpolation of Minimum Support (MOMS), which is designed as linear combinations of the B-spline of the same order and of its derivatives. FIG. 3C (red dashed line) plots the magnitude response of the filter, again compared to the 8-tap upsampler in AV1.

For resampling at factors other than 2:1, a multi-phase filter is required. As an example, a set of 32 filters (corresponding to 32 phase positions) based on the 6-tap upsampling filter had to be developed. Note that similar methodology can be applied for resampling by factors others than 2:1 (e.g., 3:1, 3:2, etc.). With that, our invention is as follows.

At an image/video encoder, which supports capabilities for rescaling of input signal by a factor of 2 using existing downsampling and upsampling filters in the design, given an input data frame, and given a decision by an RDO or some other process to downscale the input frame, a method of rescaling the input frame using one of a new set of resampling (downsampling and upsampling) filters, as selected by an RDO or another selection process, and having the following properties:

The resampling filters belong to the OLaPPS, O-MOMS, or related filter families (FastRS family);

The specific down- and upsampling filters selected have combined implementation complexity that is comparable to or less than the existing pair of filters;

The image quality performance under concatenation of the new down- and upsampling filters on a test set of image/video data is equal to or greater than the existing pair of filters, as measured in peak signal-to-noise ratio;

If the existing pair of filters is deployed in a polyphase form, the new filters are also expanded to include the same polyphase form, the polyphase extension of a specific filter being designed in two steps:

using LMS or other optimization method, finding an O-MOMS or other interpolation function of order (length −1) that agrees with the filter taps at 0-phase; and resampling the selected O-MOMS function or interpolation function at a set of points as suitable to generate a polyphase filter extension of the original filter;

Signaling the selected filter index in the encoded bitstream, if more than one filter pair is in consideration.

When a global RDO is unavailable (or undesirable, say for time/resource reasons), selecting a fixed pair of new downsampling and upsampling filters.

Experiments for ARC

Figure 3D:
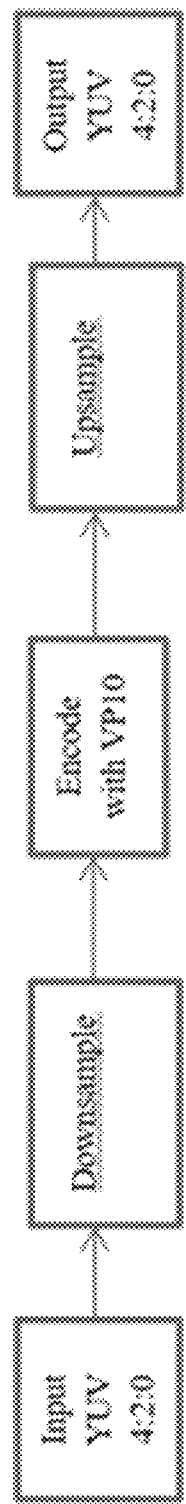
FIG. 3D shows the testing framework for adaptive resolution coding (ARC) according to an embodiment.

In order to test the ARC application, we simply assumed that we were operating under bandwidth conditions that required the use of ARC. Thus our experiment amounted to resampling all frames of a sequence, using two sets of filters: (a) AV1; and (b) FastVDO. The tests were conducted on YUV 4:2:0 8-bit input sequences with varying contents (including animation and screen content) and different resolutions. FIG. 3D shows a test setup for testing the ARC application according to an embodiment. For illustrative purposes, the sequences are down/up sampled by a factor of two, although other resolution changes can also be similarly tested. These tests with VP10 are indicative of results for AV1 as well, as both test and reference used the same codec. Table 4 shows the O-MOMS derived 32-phase extension of our 6-tap upsampling filter.

TABLE 4

A 32-phase O-MOMS extension of the 6-tap upsampling filter, at phase 16.

| Phases 0-7 | Phases 8-15 | Phases 16-23 | Phases 24-31 |
|---|---|---|---|
| {{0, 0, 32, 0, 0, 0), | {2, −5, 29, 8, −3, 1}, | {2, −6, 20, 20, −6, 2}, | {1, −3, 8, 29, −5, 2 }, |
| {1, −1, 32, 1, −1, 0}, | {2, −6, 28, 10, −3, 1}, | {1, −5, 19, 21, −6, 2}, | {1, −3, 7, 29, −4, 2}, |
| {1, −2, 32, 2, −1, 0}, | {2, −6, 27, 12, −4, 1}, | {2, −5, 17, 22, −6, 2}, | {0, −2, 7, 30, −4, 1}, |
| {1, −2, 31, 3, −1, 0}, | {2, −6, 26, 13, −4, 1}, | {1, −5, 16, 24, −6, 2}, | {0, −2, 6, 31, −4, 1}, |
| {1, −3, 31, 4, −1, 0}, | {2, −6, 25, 15, −5, 1}, | {1, −5, 15, 25, −6, 2}, | {0, −1, 4, 31, −3, 1}, |
| {1, −4, 31, 6, −2, 0}, | {1, −6, 24, 16, −5, 1}, | {1, −4, 13, 26, −6, 2} | {0, −1, 3, 31, −2, 1}, |
| {1, −4, 30, 7, −2, 0}, | {2, −6, 22, 17, −5, 2}, | {1, −4, 12, 27, −6, 2}, | {0, −1, 2, 32, −2, 1}, |
| {2, −4, 29, 7, −3, 1}, | {2, −6, 21, 19, −5, 1}, | {1, −3, 10, 28, −6, 2}, | {0, −1, 1, 32, −1, 1}}, |

Results

From table 5 it is evident that filters according to the embodiments disclosed show useful gains for higher resolution sequences, while at low resolutions there is less to gain. In any case, since the proposed approach is of the same complexity as the existing technology, there is little harm.

TABLE 5

Performance gains using proposed filters for ARC application.

| Sequences | Overall PSNR (dB) | Average Overall PSNR(dB) |
|---|---|---|
| Traffic_2560x1600 | 0.7792 | |
| PeopleOnStreet_2560x1600 | 0.6396 | 0.71 |
| ParkScene_1920x1080 | 0.611 | |
| Tennis_1920x1080 | 0.1134 | |
| Cactus_1520x1080 | 0.3042 | |
| BasketballDrive_1920x1080 | 0.2536 | 0.32 |
| KristenAndSara_1280x720 | −0.1948 | |
| FourPeople_1280x720 | 0.2826 | |
| ChinaSpeed_1024x768 | 0.2748 | 0.12 |
| BasketballDrill_832x490 | 0.4278 | |
| BQMall_832x480 | 0.1662 | |
| PartyScene_832x480 | 0.348 | 0.31 |
| BasketballPass_416x240 | 0.2494 | |
| BlowingBubbles_416x240 | −0.232 | |
| RaceHorses_416x240 | 0.3846 | |
| BQSquare_416x240 | 0.0396 | 0.11 |

High Dynamic Range Coding with Backward Compatibility

Figure 4:
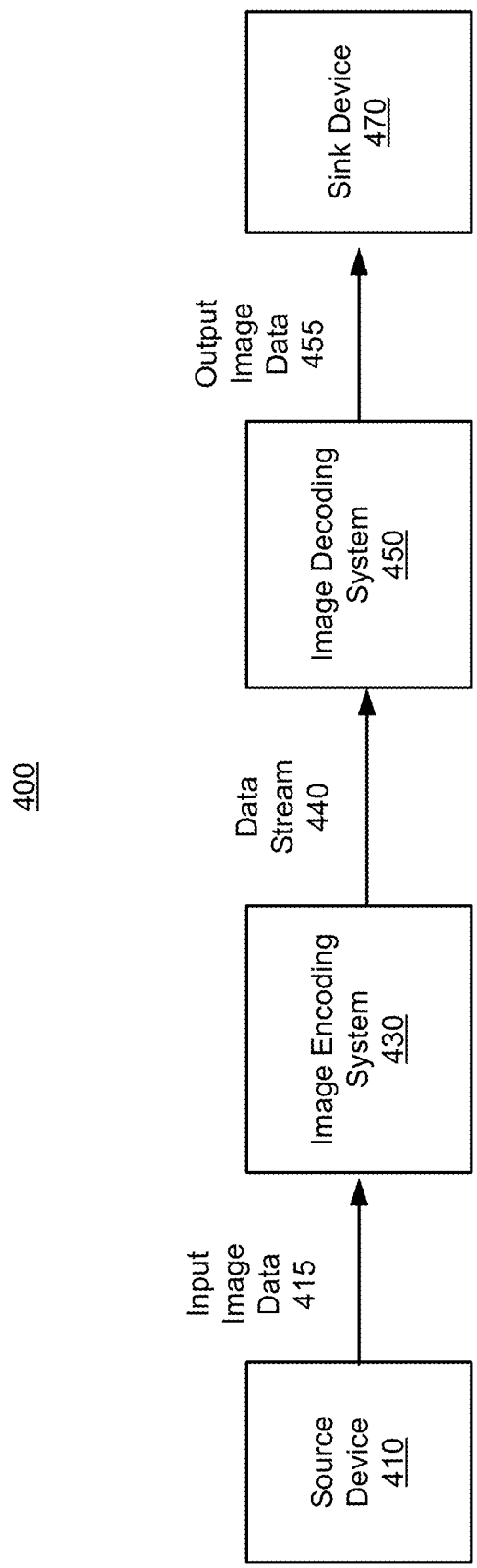
FIG. 4 is a block diagram of an image presentation system 100 according to one embodiment.

A sophisticated method for handling HDR video is developed herein, which is captured in some generality in US 2016/0360212. We call our method FastHDR henceforth. This invention entails the tailoring of that method to enhance the AV1 codec. The method allows the conversion of HDR video signals into standard dynamic range (SDR) signals, which can be directly coded with AV1 (and other modern codecs). The same method can be applied to regrade video signals of one dynamic range to another, as developed US 2016/036212. The FastHDR method is a large toolkit of techniques that incorporates all previous tools considered in this invention, including potential use of our FastLT transforms for I-frame coding, lifting based transforms for color space conversions, and resampling filters from the FastRS family, this time for chrominance resampling purposes. But the coding can of HDR video can entail exercising all of the tools developed in this invention, including FastLT plus lifting based color transforms, FastRS for spatial and chrominance resampling, and FastHDR specific tools for dynamic range grading. That is because I-frames and I-blocks are sure to occur in HDR coding; in some applications such as streaming, adverse channel conditions may require resolution changes, and in any case, resampling of chroma data is needed in HDR, and finally in our approach, regrading is an essential tool in the efficient coding of HDR data. FIG. 4 depicts a generic codec system operation, which we will specialize here. FIGS. 5-15 detail enhancements. In the sequel, we may even refer to the enhanced AV1 codec as AV1, as it operates on HDR video. Similar enhancements can be applied to virtually any modern codec, with proper adjustments.

The FastHDR method includes converting the high-dynamic range image data represented in a red-green-blue (RGB) color space to a YUV color space; obtaining a luminance signal from the converted high-dynamic range image data; generating a smoothed luminance signal based on the luminance signal; generating a base signal based on the smoothed luminance signal, the smoothed luminance signal indicative of a surplus of the high-dynamic range image data over the base signal; generating a graded base signal by performing adaptive monotonic nonlinear mapping with data adaptive tuning to the base signal; performing a color transformation of the graded base signal; downsampling chroma components of the color transformed graded base signal; encoding the downsampled signal using the AV1 codec to generate an encoded graded base signal; generating metadata describing the smoothed luminance signal; and generating a single stream including the encoded graded base signal and the metadata describing the smoothed luminance signal.

In another embodiment, if an initial high dynamic range image data is presented in a format other than the linear light RGB data, the initial high dynamic range image data is first converted to linear light RGB data, and the disclosed method is applied. In another embodiment, if the initial high dynamic range image data is presented in linear light but in a YUV 4:2:2 format or 4:2:0 format, the format of the initial high dynamic range image data is maintained, and the method is adapted to that color format.

In one embodiment, generating the smoothed luminance signal comprises automatically determining a selected number of binsizes of a luminosity histogram according to a luminance distribution characteristic of the luminance signal, and generating the luminosity histogram of the smoothed luminance signal according to the number of bins.

In one embodiment, generating the smoothed luminance signal includes three steps: transforming the luminance signal of the base signal based on an opto-electrical transfer function (OETF) to obtain an OETF luminance signal; performing a tone mapping on the transformed luminance signal based on distribution characteristics of the OETF luminance signal; and transforming the tone mapped OETF luminance signal based on an electro-optical transfer function (EOTF), the electro-optical transfer function being inverse to the OETF. In one embodiment, the tone mapping on the OETF luminance signal is either an OETF or a gamut function from BT.2020 or BT.709. In one embodiment, the tone mapping is an adaptive nonlinear function design based on statistics (e.g., mean, covariance) of the signal, and generated for example using piecewise polynomial approximations of the histogram of the luminance signal, and quantized into a finite number of bins. In one embodiment, the smoothed luminance signal can be generated by a piecewise polynomial function with a finite number of segments, by approximating each of the steps above.

In one embodiment, a similar data adaptive monotonic nonlinear process may be applied to the base signal. In some embodiments, one or more steps applied to the base signal may be different from generating the smoothed luminance signal.

In one embodiment, performing the adaptive monotonic nonlinear mapping with the data adaptive tuning is based on a sequence, GOP, frame, slice, or even block-level of base signal.

In one embodiment, the smoothed luminance signal is encoded with AV1 codec to generate metadata describing the smoothed luminance signal. The first stream may be generated by encoding the graded base signal and adding the metadata to it.

In one embodiment, the smoothed luminance signal is encoded by the AV1 codec to generate a second stream different from the first stream.

In one embodiment, metadata including parameters used for generating the smoothed luminance signal is generated. The first stream may be generated by encoding the graded base signal with AV1 codec and adding the metadata to it. The parameters may include one of an input peak brightness, a target peak brightness, a number of bins, and binsizes that are adjusted according to the luminance component.

In one embodiment, the base signal is generated by dividing the higher dynamic range image data represented in the RGB color space by the smoothed luminance signal. The base signal and the graded base signal may be represented in the RGB color space. The graded base signal represented in the RGB color space may be converted into the YUV color space prior to the encoding to obtain the first stream.

In one embodiment, the base signal is generated by dividing the converted higher dynamic range image data represented in the YUV color space by the smoothed luminance signal. The base signal and the graded base signal may be represented in the YUV color space.

In one or more embodiments, a method of generating high-dynamic range image data is disclosed. The method includes steps of: decoding a single stream with AV1 decoder to obtain a downsampled graded base signal and metadata indicative of a standard dynamic range image data and a smoothed luminance signal; upsampling the downsampled graded base signal to obtain an upsampled graded base signal; performing inverse adaptive monotonic nonlinear mapping with data adaptive tuning to the upsampled graded base signal in YUV or RGB color space to obtain the base signal; obtaining a smoothed luminance signal based on the metadata indicative of the smoothed luminance signal; and generating the high-dynamic range image data based on the base signal and the smoothed luminance signal.

In one or more embodiments, a method of generating image data is disclosed. The method includes steps of: receiving a first stream; decoding the first stream using AV1 decoder to obtain a downsampled graded base signal; upsampling the graded base signal; generating a base signal by performing inverse adaptive monotonic nonlinear mapping with data adaptive tuning to the upsampled graded base signal in YUV or RGB color space; obtaining a smoothed luminance signal, the smoothed luminance signal indicative of a surplus in a dynamic range of the image data over the base signal; and generating the image data represented in a red-green-blue (RGB) or YUV color space based on the base signal and the smoothed luminance signal In one embodiment, a second stream different from the first stream can be received. The smoothed luminance may be obtained by decoding the second stream using AV1 decoder.

In one embodiment, the smoothed luminance signal is obtained by obtaining metadata describing parameters for generating the smoothed luminance signal, and generating the smoothed luminance signal based on the parameters.

Despite one or more embodiments disclosed herein relate to encoding and decoding for high dynamic range image data, similar principles can be applied to encoding and decoding high dynamic range video data.

FIG. 4 is a block diagram of an image presentation system 400 according to one embodiment. In one embodiment, the image presentation system 400 includes a source device 410, an AV1 encoding system 430, an AV1 decoding system 450, and a sink device 470. Each of these components can be implemented in hardware, software, firmware, or a combination thereof. Source devices and sink devices include laptops, desktops, mobile phones, hand held devices and server grade machines. A source device & sink device can be the same device or different devices connected by a network. In some embodiments, the source device 410, the AV1 encoding system 430, the AV1 decoding system 450, and the sink device 470 are implemented in a single hardware system (e.g., a computing machine). In some embodiments, one or more of the source device 410, the AV1 encoding system 430, the AV1 decoding system 450, and the sink device 470 are implemented as separate computing machines and connected through a cable. In alternative embodiments, different and/or additional components may be included or some components may be omitted. In alternative embodiments, such components are connected through a network, such as LAN, wireless network, Internet, satellite, cable, and other networks.

The source device 410 generates input image data 415 and transmits the input image data 415 to the AV1 encoding system 430. The AV1 encoding system 430 receives the input image data 415 from the source device 410, and encodes the input image data 415 to generate one or more data streams 440. The AV1 decoding system 450 receives the one or more data streams 440 from the AV1 encoding system 430, and decodes the one or more data streams 440 to generate output image data 455. The sink device 470 receives the output image data 455 and visually presents an image to a user.

The AV1 encoding system 430 performs preprocessing on the input image data 415, which has a first dynamic range of an image component (e.g., luminosity or a color gamut), and encodes the preprocessed input image data to generate an intermediate image data, which has a second dynamic range lower than the first dynamic range. Similarly, the AV1 decoding system 450 receives the one or more data streams 440, and decodes the one or more data streams 440 through a decoding process, which regenerates the intermediate image data having the second dynamic range and generates the output image data 455, and then performs postprocessing on the decoded one or more data streams to generate the output image data having the first dynamic range. Detailed structures and operations of the AV1 encoding system 430 and the AV1 decoding system 450 are described in detail with respect to FIGS. 5 through 10 below.

In one embodiment, the AV1 encoding system 430 transmits two data streams 440 including a first data stream 440A and a second data stream 440B to the AV1 decoding system 450. In one embodiment, the first data stream 440A includes encoded data corresponding to a first image data including color information having a lower dynamic range than a dynamic range of the input image data 415, and the second data stream 440B includes encoded data corresponding to a second image data in grayscale indicative of a surplus of the dynamic range of the input image data 415 over the lower dynamic range of the first image data. Based on the first image data and the second image data received through the first data stream 440A and the second data stream 440B respectively, the AV1 decoding system 450 can generate the output image data 455 having the dynamic range of the input image data 415.

In another embodiment, the AV1 encoding system 430 transmits a single data stream 440 including the first data stream 440A to the AV1 decoding system 450 without transmitting the second data stream 440B. In one embodiment, the second image data in the grayscale can be encoded and added to first data stream 440A. The AV1 decoding system 450 can decode the first data stream 440A including the encoded first image data and the encoded second image data, and generates the output image data 455 based on the decoded first image data and the decoded second image data obtained through the single data stream 440. Yet in another embodiment, the AV1 encoding system 430 adds metadata to the first data stream 440A. The metadata include information or parameters used for generating the second image data at the AV1 encoding system 430. Based on the metadata and the first image data obtained through the first data stream 440A, the AV1 decoding system 450 can generate (or infer) the second image data, and further generate the output image data 455 based on the first image data and the second image data. Accordingly, the second data stream 440B need not be transmitted, thus bandwidth of information exchanged between the AV1 encoding system 430 and the AV1 decoding system 450 can be conserved.

Figure 5A:
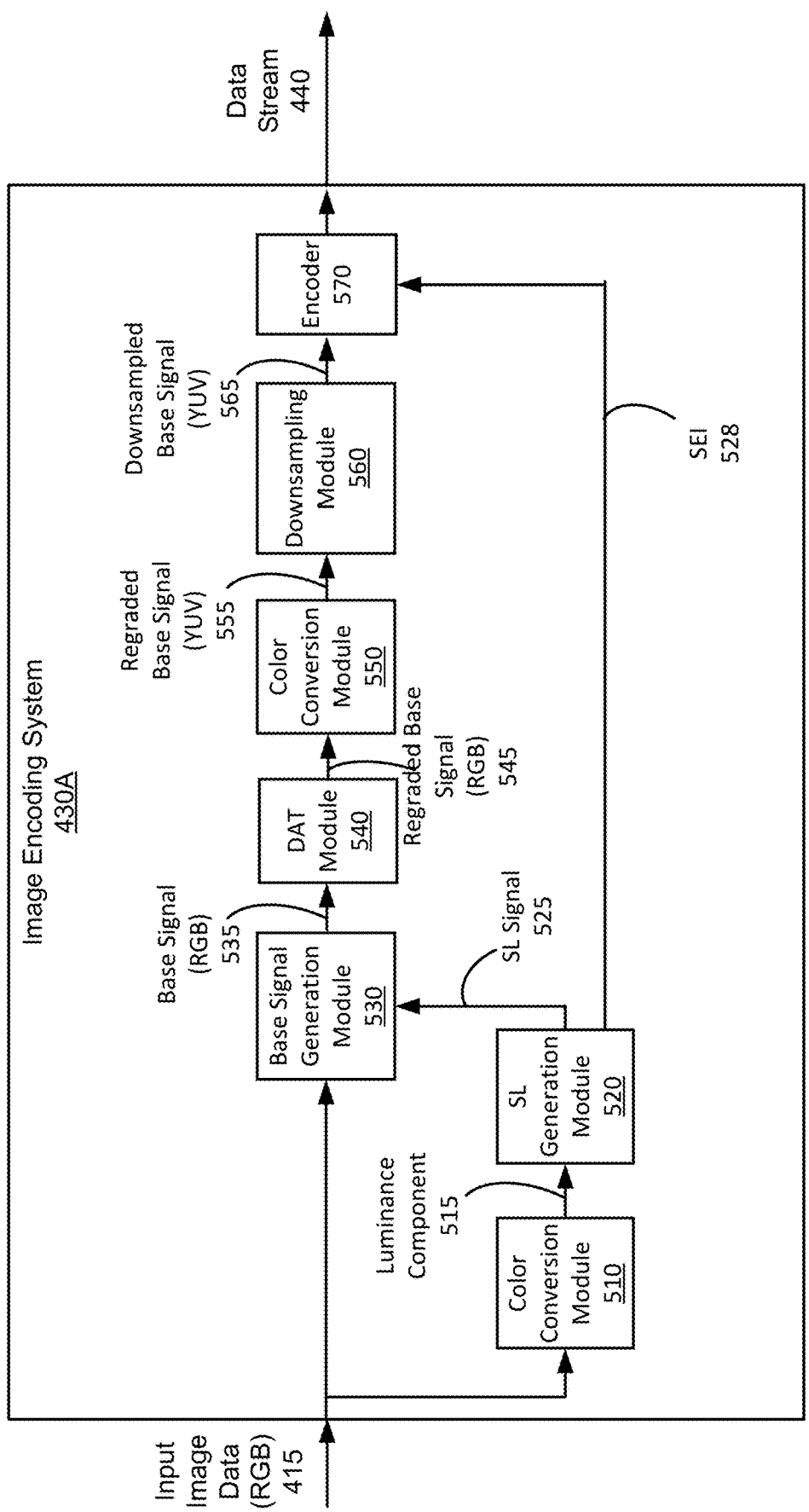
FIG. 5A illustrates an image/video encoding system according to one embodiment.

FIG. 5A illustrates an AV1 encoding system 430A according to one embodiment. In this embodiment, the AV1 encoding system 430A receives the input image data 415 and generates a single data stream 440. The data stream 440 is a stream of bits corresponding to a signal or image data having a lower dynamic range of an image component (e.g., luminosity or a color gamut) than a dynamic range of the input image data 415. In one aspect, the AV1 encoding system 430A implements the color conversion module 510, a smoothed luminance (SL) generation module 520, a base signal generation module 530, a data adaptive tuning (DAT) module 540, a color conversion module 550, a downsampling module 560, and an encoder 570. These components can be implemented as hardware, software, firmware, or a combination thereof. In alternative embodiments, different and/or additional components may be included or some components may be omitted.

The color conversion module 510 receives the input image data 415 and extracts a luminance component of the input image data 415. In one aspect, the input image data 415 is a high dynamic range image data represented in the RGB color space. The color conversion module 510 performs color conversion to convert the input image data represented in the RGB color space into a YUV color space, and then outputs a luminance component 515 of the converted image data. In one example, the YUV color space is a YCbCr color space, a YFbFr color space, or some derivation thereof (e.g., Y'CbCr). The YFbFr color space is a color space obtained through a number of lossless integer color transforms, using lifting steps, which are especially effective and efficient to implement. Details of the YFbFr color space are disclosed in U.S. Patent Application Publication No. 14/226680 ("ACTED"), and U.S. Pat. No. RE40081, which are incorporated herein in their entirety.

In one embodiment, the color transform may be adaptive to input data, with the adaptation taking place at the sequence, GOP, frame, slice, or even block-level. The selection can be made for example by measuring the decorrelation efficiency on the input data (according to a measure such as coding gain, or by actually coding the data and using rate-distortion analysis). If the color transforms are selected from a small table, one can signal the selection by a simple index in the metadata in the bitstream.

Figure 6A:
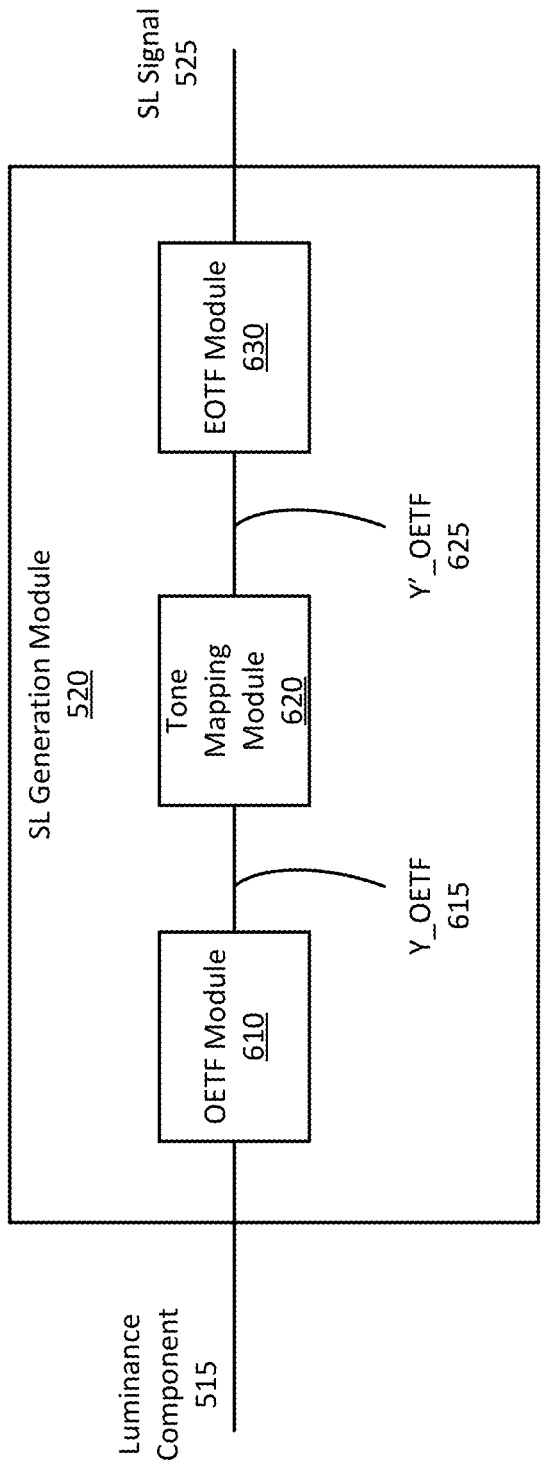
FIG. 6A illustrates a smoothed luminance generation module of the image/video encoding system according to one embodiment.

The SL generation module 520 receives the luminance component 515 from the color conversion module 510 and generates the SL signal 525. In one aspect, the smoothed luminance (SL) signal 525 is an intensity-only signal (or grayscale image data), which in some embodiments contains the low frequency intensity information of the input image data 415, or a graded version of the luminance. In some embodiments, the SL signal 525 is generated by performing non-linear mapping on the luminance component 515. In one example, as depicted in FIG. 6A, the SL generation module 520 applies a series of operations to the luminance component 515 including: applying an OETF, applying a monotonically increasing nonlinear function, applying an EOTF. Such a combination of operations permits creating a method to grade the initial high dynamic range image data into standard dynamic range data (or more generally, creating image data with a different peak luminosity), while working in a perceptually more uniform domain. This allows the regrading to appear more natural and consistent. Components of this process, or the entire process, may be computed by a piecewise polynomial function of finite steps.

The base signal generation module 530 receives the input image data 415 and the SL signal 525, and generates the base signal 535. The base signal 535 is a signal or image data having a lower dynamic range than the input image data. In one aspect, the base signal 535 is compatible with the standard dynamic range image data capable of representing up to 100 nits, hence the base signal 535 may be displayed through by a standard dynamic range display device. In the embodiment shown in FIG. 2A, the base signal generation module 530 generates the base signal 535 represented in the RGB color space. Specifically, the base signal generation module 530 generates the base signal 535 by dividing the input image data 415 represented in the RGB color space by the SL signal 525. That is, each color component (RGB) of the base signal 535 is divided by the SL signal 525. Hence, the input image data 415 can be represented as the following Equation (1):

$$RGB_{HDR} = SL * B \quad (1)$$

where $RGB_{HDR}$ corresponds to values of the input image data 415 (for red, green, blue components), SL corresponds to the SL signal 525, and B corresponds to the base signal 535 of red, green, blue color components. In one aspect, the SL signal 525 represents a surplus of the first dynamic range of the input image data 415 over the second dynamic range of the lower dynamic range image data or the base signal.

The DAT module 540 receives the base signal 535 from the base signal generation module 530, and performs adaptive monotonic nonlinear mapping with data adaptive tuning to the base signal 535 to generate a graded base signal 555. In the embodiment shown in FIG. 5A, the DAT module 540 receives the base signal 555 in the RGB color space, and performs adaptive monotonic nonlinear mapping with data adaptive tuning in the RGB color space to generate the graded base signal 545 in the RGB color space. In some embodiments, the graded base signal 555 is generated by performing a nonlinear mapping on the base signal 535, and applying data-adaptive tuning. In one example, the DAT module 540 applies a monotonically increasing nonlinear function to the base signal 535 to improve the naturalness and consistency of the graded imagery with respect to the higher luminosity signal. In one approach, the DAT module 540 measures statistics on the base signal 555 (e.g., a histogram of the luminosity component), and performs adaptive monotonic nonlinear mapping based on the measured statistics of the base signal 555. In some embodiments, the data adaptive tuning performed by the DAT module 540 can be implemented in a similar manner as the SL generation module 520.

The color conversion module 550 receives the graded base signal 555 represented in the RGB color space, and performs color conversion to obtain the regraded base signal 555 represented in the YUV color space. In one embodiment, the color conversion modules 510 and 550 perform a same type of color conversion. Alternatively, the color conversion module 510 may extract only the luminance component 515, while the color conversion module 550 converts all image components (e.g., RGB values) in one color space into all image components (e.g., YUV values) in another color space.

The downsampling module 560 receives the graded base signal 555 and downsamples the graded base signal 555 to generate a downsampled base signal 565. In the embodiment shown in FIG. 5A, the downsampling module 560 receives the graded base signal 555 represented in the YUV color space, and performs downsampling in the YUV color space to generate the downsampled base signal 565 represented in the YUV color space. In one embodiment, the downsampling module 560 downsamples the chroma components (i.e., color components) of the graded base signal 555, but not the luminance component of the graded base signal 555. In one embodiment, the downsampling module 560 downsamples the graded base signal 555 in a YUV 4:4:4 format to a YUV 4:2:2 format (i.e., downsamples horizontally, but not vertically). In another embodiment, the downsampling module 560 downsamples to the graded base signal 555 in the YUV 4:4:4 format to the YUV 4:2:0 format (i.e., it downsamples in both directions).

Note that in some embodiments, the DAT module 540 may be interspersed in between these conversions; that is, the DAT module 540 may be applied in any of the domains: YUV 4:4:4, YUV 4:2:2, or YUV 4:2:0. Likewise, the AV1 encoder 570 may be capable of encoding any of YUV 4:4:4, YUV 4:2:2, or YUV 4:2:0.

In one embodiment, the filters implemented by the downsampling module 260 are adaptive to input data, with the adaptation taking place at the sequence, GOP, frame, slice, or even block-level. The selection can be made, for example, by measuring the reconstruction fidelity (according to a measure such as peak signal-to-noise ratio (PSNR), with many others available) of the signal after consecutively down and up sampling, or by actually coding the data and using rate-distortion analysis. If the resampling filters are selected from a small table, the selection can be indicated by a simple index in the metadata in the data stream 440.

In one implementation, the downsampling module 560 includes one or more filters to downsample the graded base signal 555. Given a discrete filter x[n], M unique phases of filter x can be obtained by downsampling x by M. For example, when M=2, there are two phases, which can be labeled as the 0-phase and the 1-phase; the 0-phase of the discrete filter x[n] is x[2n], and the 1-phase of x[n] is x[2n+1]. In this configuration, the other phases can be derived from the zero phase by non-unique interpolation. As a specific example, a standard grid for resampling in chroma from a 4:4:4 format to a 4:2:0 format, as practiced in both AVC and HEVC, requires the use of 4-phase resampling. As a concrete example, suppose the zero-phase 2N+1 tap horizontal down sampling filter is hd[n], where n=−N, . . . , −1, 0, 1, . . . N. Then the 1-phase vertical down sampling filter vd[n] can be derived by interpolating hd[n] by a factor of 2 using spline interpolation method to get d[n], where hd[n]= hd[2n], for n=−N, . . . , −1, 0, 1, . . . N. The horizontal down sampling filter is the 0-0phase filter of hd2[n], and the vertical down sampling filter is the 1-phase filter of hd2[n], where vd[n]=hd2[2n+1], for n=−N, . . . , −1, 0, 1, . . . N. Examples of filter values are provided in Table 6 below.

TABLE 6

Example Filter Values

| | |
|---|---|
| Hd | (+8.0, 0.0, +31 64.0, +128.0, +368.0, +128.0, −64.0, 0.0, +8.0)/256 |
| D | ((+8.0, +8.0, 0.0, 0.0, −24.0, −64.0, +48.0, +128.0, +224.0, +368.0, +224.0, +128.0, +48.0, −64.0, −24.0, 0.0, 0.0, +8.0, +8.0)/256 |
| Vd | (+8.0, 0.0, −24.0, +48.0, +224.0, +224.0, +48.0, −24.0, +0.0, +8.0)/256 |

In one embodiment, the downsampling module 560 includes a horizontal downsampling filter for downsampling the graded base signal 555 in the 4:4:4 format down to a 4:2:2 format, and a vertical downsampling filter for downsampling the downsampled signal in the 4:2:2 format down to the 4:2:0 format. The vertical downsampling filter may be a phase shifted version of the horizontal downsampling filter. Hence, the graded base signal 555 represented in the 4:4:4 format can be downsampled to obtain the downsampled graded base signal represented the 4:2:0 format. Example coefficients of the horizontal downsampling filter is listed in Table 7, and example coefficients of the vertical downsampling filter is listed in Table 8.

TABLE 7

Example Horizontal Downsampling Filter Coefficients (4:4:4 to 4:2:2)

| Tap k | −5 | −4 | −3 | −2 | −1 | 0 | 1 | 2 | 3 | 4 | 5 |
|---|---|---|---|---|---|---|---|---|---|---|---|
| Coefs c1[k] | 1 | 0 | −3 | 0 | 10 | 16 | 10 | 0 | −3 | 0 | 1 |

TABLE 8

Example Vertical Downsampling Filter Coefficients (4:2:2 to 4:2:0)

| Tap k | −5 | −4 | −3 | −2 | −1 | 0 | 1 | 2 | 3 | 4 | 5 | 6 |
|---|---|---|---|---|---|---|---|---|---|---|---|---|
| Coefs c2[k] | 9 | 13 | −27 | −42 | 75 | 228 | 228 | 75 | −42 | −27 | 13 | 9 |

The AV1 encoder 570 receives the downsampled base signal 565 from the downsampling module 560, and generates an encoded base signal 575A. In one embodiment, the AV1 encoder 570 generates the data stream 440 by encoding the downsampled base signal 565 using the codec and adding metadata in the supplemental enhancement information (SEI) 528 indicative of parameters used in the SL generation module 520 for generating the SL signal 525, and also metadata describing parameters used in the DAT module 540 for generating the graded base signal 545 to the encoded downsampled base signal 565. By integrating the SEI 528 with the encoded base signal, bandwidth of information transmitted to the image decoding system 450 can be greatly reduced, while still allowing full reconstruction of the high dynamic range data.

In alternative embodiment, an additional encoder is implemented in the AV1 encoding system 430A to encode the SL signal 525. The encoded SL signal can be combined with the encoded base signal again as metadata in an SEI, and transmitted to the AV1 decoding system 450 through the single data stream 440. This requires only a slightly higher bandwidth (about 1% higher) then a method in which the SL is derived, but provides for a more precise recovery of the SL signal, and reconstruction of the HDR signal.

Figure 5B:
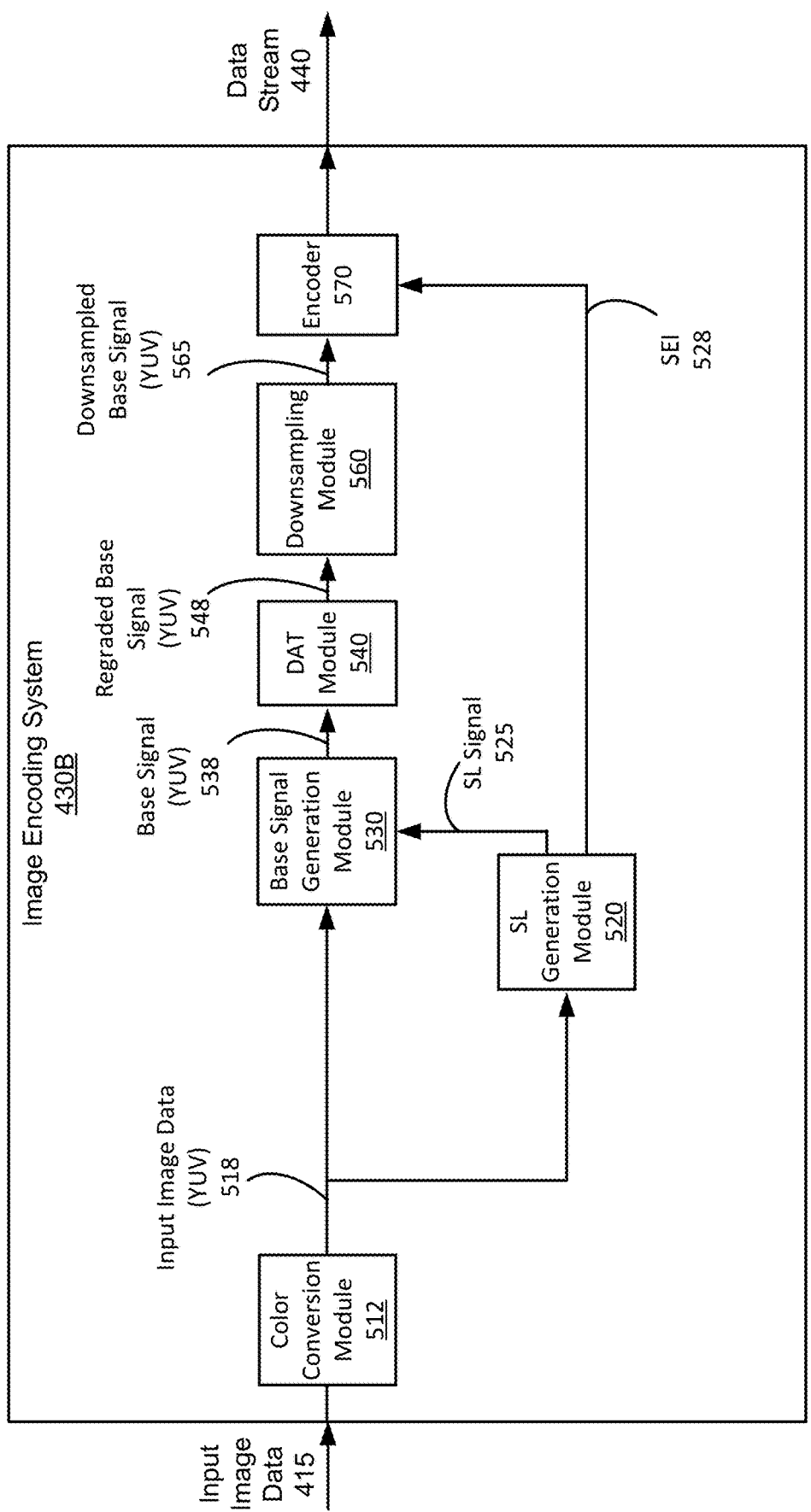
FIG. 5B illustrates an image/video encoding system according to another embodiment.

FIG. 5B illustrates an AV1 encoding system 430B according to another embodiment. The AV1 encoding system 430B receives the input image data 415 and generates the data stream 440. In the embodiment shown in FIG. 5B, the encoding system 430B includes a single color conversion module 512, the SL generation module 520, the base signal generation module 530, the DAT module 540, the downsampling module 560, and the encoder 570. The configurations of these components are similar to the ones shown in FIG. 5A, except that a single color conversion module 512 is implemented instead of the color conversion modules 510, 550 of FIG. 5A.

Specifically in the embodiment shown in FIG. 5B, an output of the color conversion module 512 is directly coupled to an input of the base signal generation module 530 and an input of the SL generation module 520. Hence, the base signal generation module 530 receives the input image data 518 represented in the YUV color space, and obtains the base signal 538 represented in the YUV color space. In one aspect, the base signal 538 can be obtained according to the following Equation (2):

$$Y_{SDR} = \frac{Y_{HDR}}{Y\_SL}, Cb_{SDR} = \frac{Cb_{HDR}}{Cb\_SL}, Cr_{SDR} = \frac{Cr_{HDR}}{Cr\_SL} \quad (2)$$

where $Y_{HDR}$ is a luminance component of the input image data 518 represented in the YUV color space, $Cb_{HDR}$ is a blue difference chroma component of the input image data 518 represented in the YUV color space, $Cr_{HDR}$ is a red difference chroma component of the input image data 518 represented in the YUV color space. In this embodiment, the Y_SL, Cb_SL, and Cr_SL, are new components that can be functionally derived from the previously computed SL signal; this is designed to allow a slightly difference regrading in chroma than luma if desired; if all are set to equal SL, this reduces to the previous approach. Y_SL can be a luminance component of the SL signal 525, Cb_SL can be a derived blue difference chroma component of the SL signal 525, and Cr_SL can be a derived red difference component of the SL signal 525. $Y_{SDR}$ is a luminance component of the base signal 538 represented in the YUV color space, $Cb_{SDR}$ is a blue difference chroma component of the base signal 538 represented in the YUV color space, and $Cr_{SDR}$ is a red difference chroma component of the base signal 538 represented in the YUV color space. In some embodiments, the Cb_SL and Cr_SL can be replaced with Y_SL as before.

The remaining components (e.g., the SL generation module 520, the downsampling module 560, the DAT module 540, and the AV1 encoder 570) operate as shown in FIG. 5A. Therefore, the detailed description thereof is omitted herein for the sake of brevity.

Figure 5C:
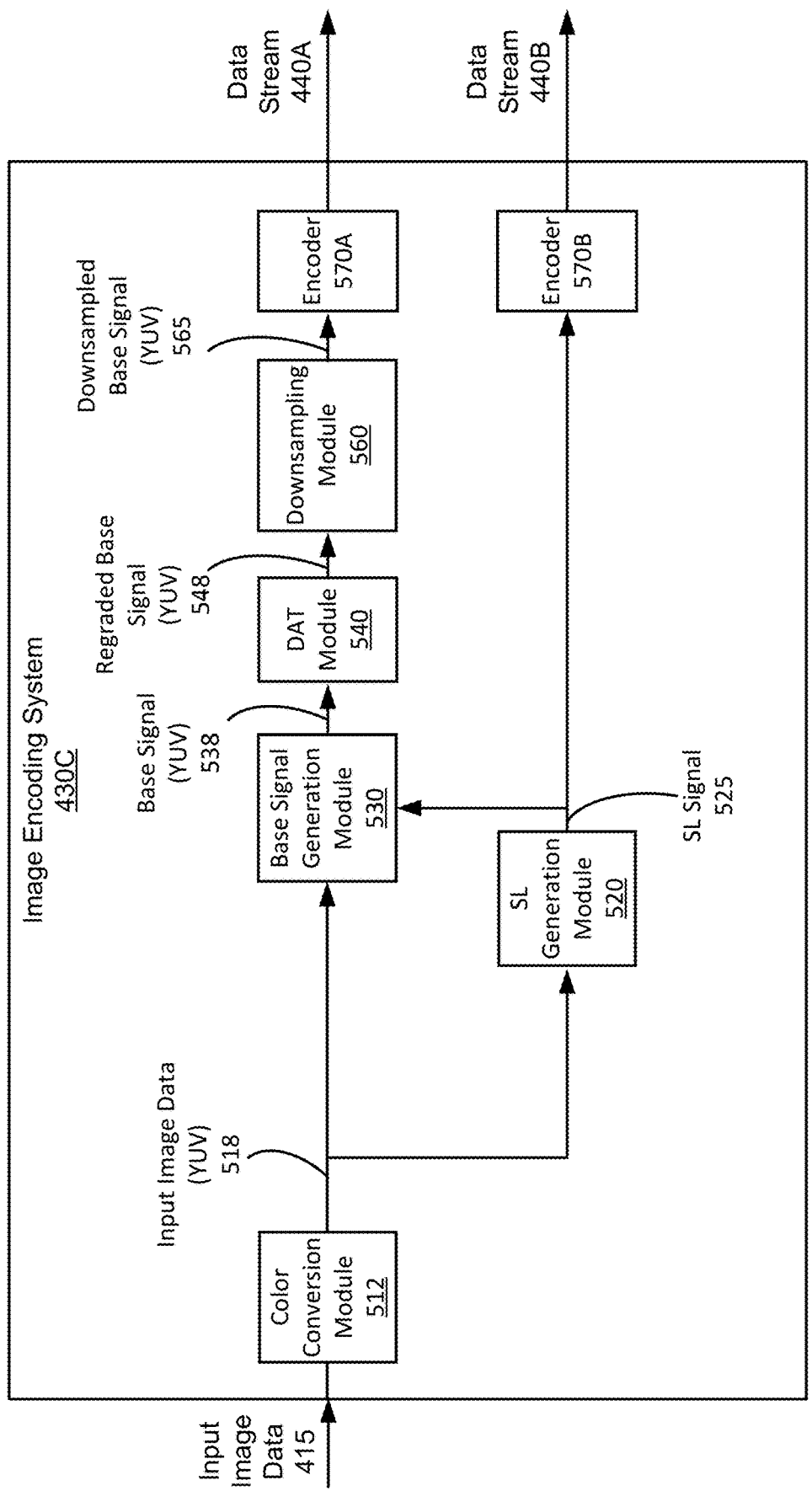
FIG. 5C illustrates an image/video encoding system according to another embodiment.

FIG. 5C illustrates an AV1 encoding system 430C according to another embodiment. In this embodiment, the AV1 encoding system 430C receives the input image data 415 and generates dual data streams 440. In the embodiment shown in FIG. 5C, the encoding system 430B includes the color conversion module 512, the SL generation module 520, the base signal generation module 530, the DAT module 540, the downsampling module 560, and AV1 encoders 570A, 570B. The configurations of these components are similar to the ones shown in FIG. 5B, except that two AV1 encoders 570A, 570B generate two data streams 440A, 440B. These two streams can be combined into one stream according to a scalable coding architecture, or remain as two separate streams.

FIG. 6A illustrates the SL generation module 520 of the AV1 encoding system 430 according to one embodiment. In one embodiment, the SL generation module 520 includes an OETF module 610, a tone mapping module 620, and an electro-optical transfer function (EOTF) module 630. These components operate together to receive the luminance component 515 and generate the SL signal 525 based on the luminance component 515. In one aspect, the SL generation module 520 applies adaptive techniques for generating and scaling the SL signal 525. These components can be implemented as hardware, software, firmware, or a combination thereof. In alternative embodiments, different and/or additional components may be included or some components may be omitted.

The OETF module 610 receives the luminance component 515 and applies a transfer function for transforming the luminance component 515 represented in a linear luminance domain into a non-linear luminance domain prior to performing non-linear mapping. In one embodiment, the OETF module 610 applies a transfer function such as the SMPTE (Society for Motion Picture and Television Engineers) standards ST-2084 (PQ TF) or the Philips TF (potentially part of ST-2094.20). In another embodiment, the OETF module 610 applies a transfer function as shown in Equation (3) below:

$$Y_{OETF} = \log((Rho-1)*powf(Y,(1/2.40))+1)/\log(Rho), \qquad (3)$$

where Rho=32.0*powf((InputPeakBrightness/TgtPeakBrightness),(1/2.40))+1.

The InputPeakBrightness is a peak brightness (e.g., 1,000 nits) of the input image data 415 or the luminance component 515 automatically measured, for example by the OETF module 610. The TargetPeakBrightness is a target peak brightness is a parameter in the transfer process, and may for example be selected as the desired output peak brightness value (e.g., 100 nits, starting with 1000 nits input). By measuring the InputPeakBrightness, the transformation of the luminance component 515 can be performed in an adaptive manner, to achieve a more natural, data-appropriate transfer function Yet in another embodiment, the OETF module 610 applies a transfer function as shown in Equation (4) below:

$$Y_{OETF} = powf(((c2*powf(Y,m1)+c1)/(1.0+c3*powf(Y,m1))),m2), \qquad (4)$$

where $$powf(a,b)=a^b,$$

$$m1 = (2610.0)/(4096.0*4.0),$$

$$m2 = \left(\frac{(2523.0*128.0)}{4096}\right)*\left(1+0.25*\log\left(\frac{TgtPeakBrightness}{InputPeakBrightness}\right)\right),$$

$$c1=(3424.0)/4096.0,$$

$$c2=(2413.0*32.0)/4096.0, \text{ and}$$

$$c3=(2392.0*32.0)/4096.0.$$

In addition, Data-Adaptive Tuning (DAT) can be applied to the transfer function, which uses statistics of the data to improve coding. By applying DAT, the OETF module 610 generates the transformed luminance signal Y_OETF 615. In some embodiments, both the method of tuning (e.g., which TF function to use, and whether additional nonlinear functions are applied), and the frequency of tuning, whether applied at the sequence, GOP, frame-level, or even slice or block-level may be varied in complexity.

The tone mapping module 620 receives the transformed luminance signal Y_OETF 615 from the OETF module 610 and performs non-linear mapping on the transformed luminance signal Y_OETF 615. Specifically, the tone mapping module 620 controls the dynamic range of the input and the output of the tone mapping. For example, the tone mapping module 620 applies a polynomial mapping represented as a power function shown in Equation (5) below:

$$y=(a*x+b)^{\alpha}, \qquad (5)$$

where x corresponds to transformed luminance signal Y_OETF 615, and y is the mapped luminance signal Y'_OETF 625. For simplicity, a piecewise-linear model with L pieces can be applied, where L>=1. For each piece, Equation (6) reduces to:

$$y=a(k)*x+b(k), k=0,1,\ldots,(L-1) \qquad (6)$$

where, k represents the $k^{th}$ piece or bin. These equations are applied to the transformed luminance signal Y_OETF 615 as input x to generate the mapped luminance signal Y'_OETF 625.

Figure 6B:
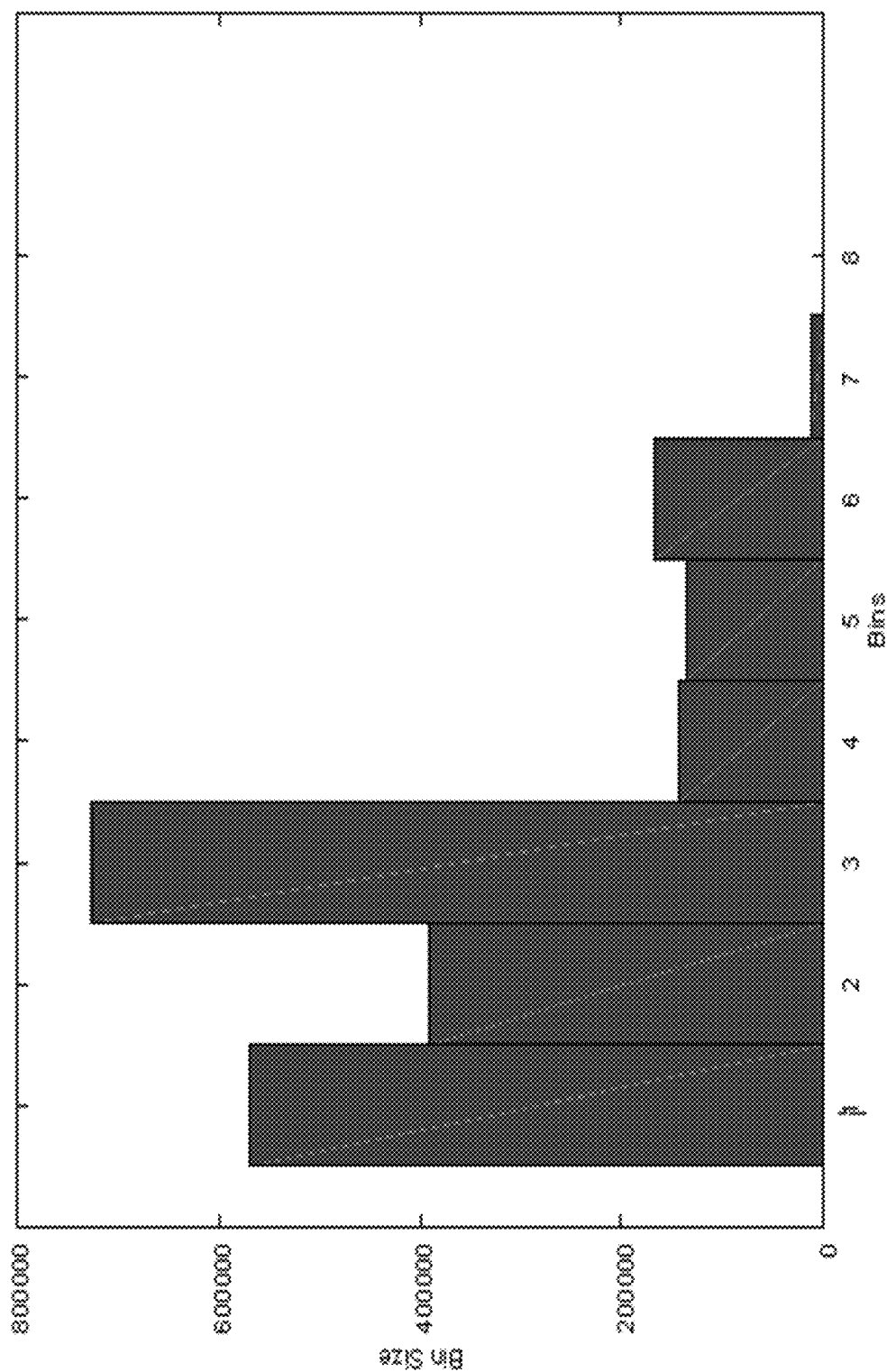
FIG. 6B illustrates an example binned histogram of an image/video before data adaptive tuning according to one embodiment.
Figure 6C:
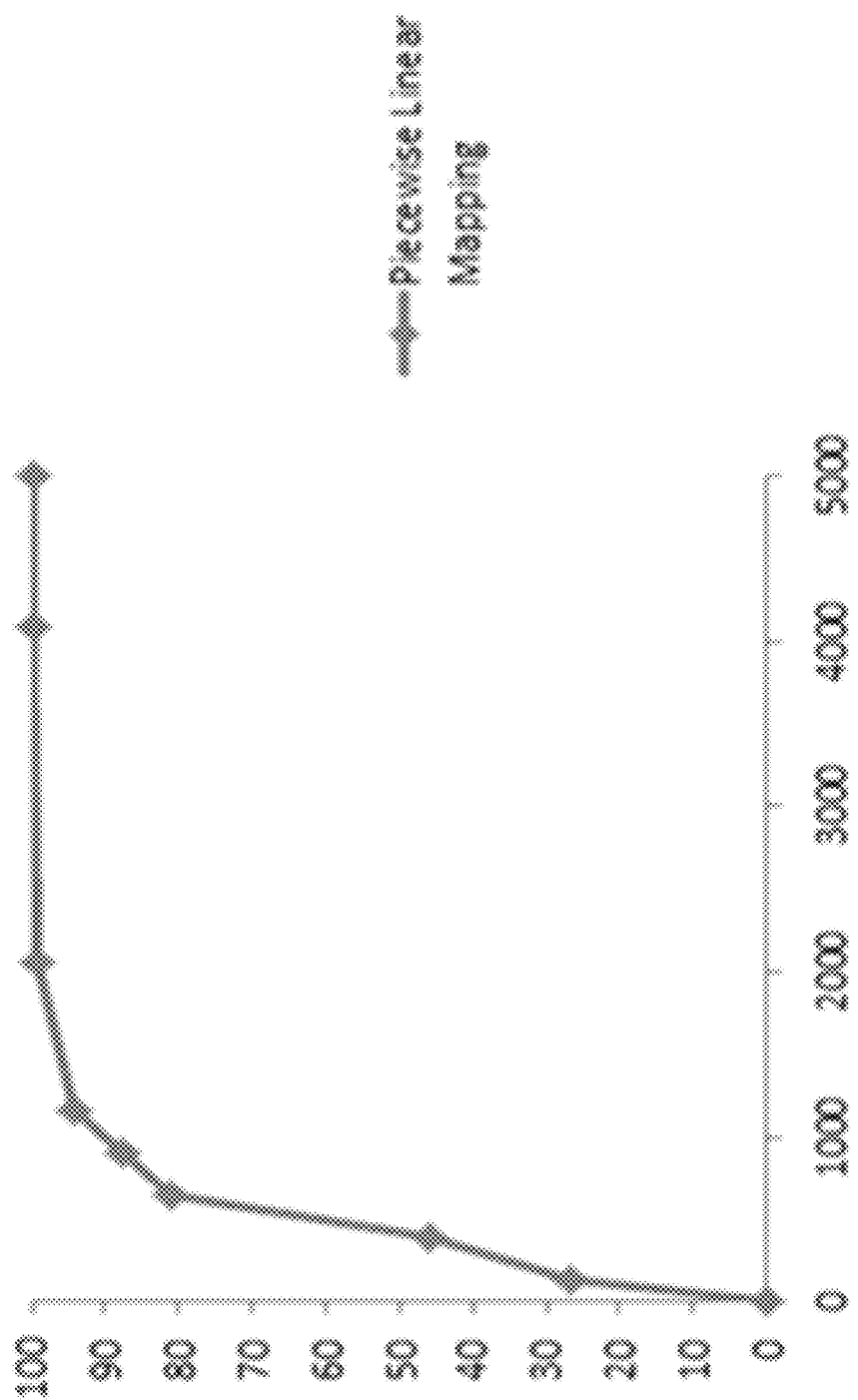
FIG. 6C illustrates an example piecewise linear mapping of an image/video according to the histogram in FIG. 6B.

In one embodiment, the coefficients a(k), b(k) in the Equation (6) above are sequence dependent and are derived based on the distribution characteristics of the HDR input signal. In one example, the tone mapping module 620 determines the coefficients a(k), b(k) based on a histogram analysis. For example, the transformed luminance signal Y_OETF 615 is segmented to L bins, and a count is obtained for the number of pixels in each bin (which we call binsize). FIG. 6B illustrates an example histogram of a luminance image before data adaptive tuning, where a luminance of transformed luminance signal Y_OETF 615 is divided into an example 8 bins. Under an optimization process, the number of bins and their respective sizes are automatically determined according to an input data such that the lower and mid tone levels have an improved representation compared to the unadjusted transfer function representation. Thus, the coefficients a(k), b(k) can be determined as shown in Equation (7) below:

$$a(k) = \left(\frac{binsize_k}{NumTotPixels}\right)*(MAX\_DISPLAY\_LUMA/MAX\_LUMA\_BIN_k)$$

$$b(0)=0$$

$$b(k)=a(k-1)*MAX\_LUMA\_BIN_{k-1}+b(k-1)-a(k)*MAX\_LUMA\_BIN_{k-1} \qquad (7)$$

where $MAX\_LUMA\_BIN_k$ is the maximum luminance value of the transformed luminance signal Y_OETF 615 in bin k, and $binsize_k$ is the number of pixels in bin k. The piecewise linear DAT function corresponding to FIG. 6B is given in FIG. 6C. In one approach, the numbers $binsize_k$ are sent in the data stream 440 as metadata (e.g., SEI 275B of FIG. 2C). In another approach, these numbers are indexed, and only an index is sent for each number. In one embodiment, this DAT can easily be applied at the sequence, GOP, frame, slice, or block level.

The EOTF module 630 receives the mapped luminance signal Y' OETF 625 from the tone mapping module 620, and generates the SL signal 525. In one embodiment, the EOTF module 630 converts the mapped luminance signal Y' OETF 625 represented in a perceptual luminance domain into a linear luminance domain. In one example, the EOTF module 630 obtains the SL signal 525 according to Equation (8) below:

$$SL=Y/TL, \quad (8)$$

where SL corresponds to the SL signal 525, Y corresponds to the luminance component 515, and TL is an intermediate signal for generating the SL signal 525 based on the luminance component 515. In case the OETF module 610 implements the transfer function as shown in equation (3), the EOTF module 630 produces the intermediate signal TL as shown in an equation (9) below:

$$TL=powf((powf(Rho,Y'_{OETF})-1)/(Rho-1),2.40). \quad (9)$$

In case the OETF module 610 implements the transfer function as shown in Equation (4), the EOTF module 630 produces a TL as shown in Equation (10) below:

$$TL = powf\left(\frac{\text{Max}\left(0.0, powf\left(Y'_{OETF}, \frac{1.0}{m2}\right) - c1\right)}{c2 - c3 * powf\left(Y'_{OETF}, \frac{1.0}{m2}\right)}, \frac{1.0}{m1}\right). \quad (10)$$

where Max(a, b) returns a if a>b, else b.

In one embodiment, the SL generation module 520 obtains the SL signal 525 by a smoothing process on the input luminance component 515. In one embodiment, the SL signal 525 is obtained as a linear combination of a predefined shaped function. As an example, a 2D Gaussian function can be employed, because the impulse response of many natural and manmade systems is Gaussian. The individual shape functions are then mathematically built as a partition of unity. In another embodiment, the SL signal 525 is obtained by applying a smoothing filter (again such as by a 2D Gaussian) to the luminance component 515.

Modeling of the smoothed luminance signal by separable shape functions is challenging, as is smoothing a signal by a Gaussian function. For example, the modeling involves matrix computations, which are not hardware friendly and requires considerable memory; Gaussian smoothing is likewise not hardware friendly. To overcome those disadvantages, a moving average filter can be used to obtain the low frequency version of the image. The conventional coding techniques are too complicated to perform. The moving average filter is hardware friendly and easy to implement as an add-on or pre/processing unit.

Taking M point moving averaging filter as an example, where M is chosen as an odd number, and the input signal is symmetrical around the output signal. Let M=2N+1, the M point moving average filter is defined as Equation (11) below:

$$y[i] = \frac{1}{M}\sum_{j=-N}^{N} x[i+j] \quad (11)$$

By analysis using the Central Limit Theorem, a high quality approximation of Gaussian smoothing can be obtained by the simple moving average filter.

Figure 7A:
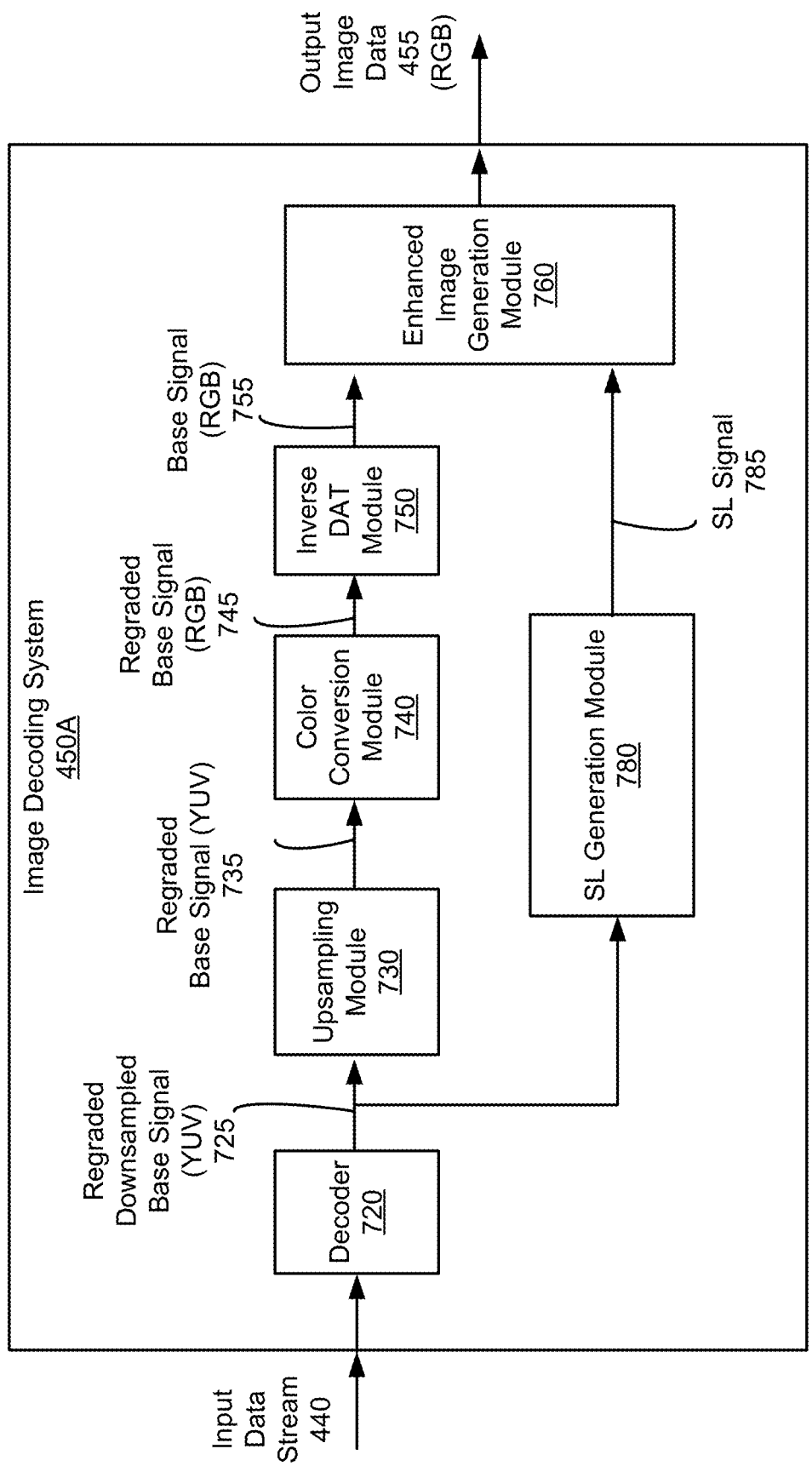
FIG. 7A illustrates an image/video decoding system according to one embodiment.

FIG. 7A is an AV1 decoding system 450A according to one embodiment. The AV1 decoding system 450A receives a single data stream 440, for example, from the AV1 encoding system 430A of FIG. 5A, and generates the output image data 455. In one aspect, the output image data are a HDR image data represented in the RGB color space. In one embodiment, the AV1 decoding system 450A includes a decoder 720, an upsampling module 730, a color conversion module 740, an inverse DAT module 750, an enhanced image generation module 760, and a SL generation module 780. These components can be implemented as hardware, software, firmware, or a combination thereof. In alternative embodiments, different and/or additional components may be included or some components may be omitted.

The AV1 decoder 720 receives the input data stream 440, for example, from the AV1 encoding system 430A, and generates a regraded downsampled base signal 725. The AV1 decoder 720 decodes the input data stream 440 to generate the graded downsampled base signal 725 in the YUV color space.

In one embodiment, the AV1 decoder 720 receives the input data stream 440, and obtains the SEI (e.g., InputPeakBrightness, TargetPeakBrightness, a number of bins, bin-size$_k$, etc.) by decoding a portion of the input data stream 440 corresponding to metadata.

The SL generation module 780 receives the graded downsampled base signal 725 and the SEI from the AV1 decoder 720, and generates the SL signal 785. In one embodiment, the SL generation module 780 obtains information describing the DAT performed by the AV1 encoding system 430 in the SEI, and applies inverse DAT to the graded downsampled base signal 725 to infer the SL signal 785 without actually receiving the SL signal from the AV1 encoding system 450A. Detailed structure and operation of the SL generation module 780 are described below with respect to FIG. 8.

The upsampling module 730 receives the graded downsampled base signal 725 from the AV1 decoder 720A, and generates a graded base signal 735. In the embodiment shown in FIG. 7A, the upsampling module 730 receives the graded downsampled base signal 725 represented in the YUV color space, and performs upsampling in the YUV color space to generate the graded base signal 735 represented in the YUV color space. In one embodiment, the upsampling performed by the upsampling module 730 is inverse to the downsampling performed by the downsampling module 560 of FIG. 5A.

In one embodiment, the upsampling module 730 implements interpolation filters for generating the graded base signal 735. The filters implemented by the upsampling module 730 may be adaptive to input data, with the adaptation taking place at the sequence, GOP, frame, slice, or even block-level.

In one embodiment, the upsampling module 730 includes four interpolation filters to upsample the graded downsampled base signal 725. For example, horizontal up sampling filter for even pixels, vertically up sampling filter for odd pixels, horizontal up sampling filter for odd pixels, and vertically up sampling filter for even pixels can be implemented. Let u[n] be a (non-unique) discrete interpolation filter, and then the filters used for horizontal and vertical upsampling can be identified as Equation (12) below:

$$\text{hue}[n]=u[4n], \text{vuo}[n]=u[4n+1], \text{huo}[n]=u[4n+2], \text{ and}$$
$$\text{vue}[n]=u[4n+3]. \quad (12)$$

Example filter values are provided in Table 9 below.

TABLE 9

Example Filter Values

| | |
|---|---|
| u | (+8.0, +0.0, −16.0, −16.0, −32.0, +0.0, +56.0, +144.0, +240.0, +256, +240.0, +144.0, +56.0, +0.0, −32.0, −16.0, −16.0, +0.0 +8.0)/256 |
| hue | (+256.0) /256 |
| vuo | (+0.0, −16.0, +56.0, +240.0, −32.0, +8.0) /256 |
| huo | (−16.0, +144.0, +144.0, −16.0) /256 |
| vue | (+8.0, −32.0, +240.0, +56.0, −16.0, +0.0) /256 |

As an example, two separate vertical upsampling filters are used to restore samples at odd and even indices, respectively. Example filter coefficients for even samples filter are provided in Table 10, while those for the odd samples are provided in Table 11. Similarly, two separate horizontal upsampling filters are used to restore samples at odd and even indices, respectively. Example filter coefficients for even samples filter are provided in Table 12, while those for the odd samples are provided in Table 13.

TABLE 10

Example Vertical Upsampling Filter Coefficients
(4:2:0 to 4:2:2) for Even Samples

| Tap k | −3 | −2 | −1 | 0 | 1 | 2 |
|---|---|---|---|---|---|---|
| Coefs d1[k] | 9 | −27 | 75 | 228 | −42 | 13 |

TABLE 11

Example Vertical Upsampling Filter Coefficients
(4:2:0 to 4:2:2) for Odd Samples

| Tap k | −2 | −1 | 0 | 1 | 2 | 3 |
|---|---|---|---|---|---|---|
| Coefs d2[k] | 9 | 13 | −27 | −42 | 75 | 228 |

TABLE 12

Example Horizontal Upsampling Filter Coefficients
(4:2:2 to 4:4:4) for Even Samples

| Tap k | 0 |
|---|---|
| Coefs d3[k] | 16 |

TABLE 13

Example Horizontal Upsampling Filter Coefficients
(4:2:2 to 4:4:4) for Odd Samples

| Tap k | −2 | −1 | 0 | 1 | 2 | 3 |
|---|---|---|---|---|---|---|
| Coefs d4[k] | 1 | −3 | 10 | 10 | −3 | 1 |

The color conversion module 740 receives the graded base signal 735 from the inverse DAT module 750 and performs color conversion. In the embodiment shown in FIG. 7A, the color conversion module 740 receives the graded base signal 735 represented in the YUV color space, and performs color conversion to obtain the graded base signal 745 represented in the RGB color space.

The inverse DAT module 750 receives the graded base signal 745 from the color conversion module 740, and applies an inverse transfer function to the graded base signal 745 to obtain a base signal 755. In the embodiment shown in FIG. 7A, the inverse DAT module 750 receives the graded base signal 745 in the RGB color space, and performs inverse adaptive monotonic nonlinear mapping with data adaptive tuning in the RGB color space to generate the base signal 755 in the RGB color space. In some embodiments, the base signal 755 is generated by performing an inverse process to the adaptive monotonic nonlinear mapping with data adaptive tuning performed by the DAT module 540 of FIG. 5A. For example, the parameters used for performing DAT can be extracted from the metadata included in the input data stream 440, and the inverse adaptive monotonic nonlinear mapping can be performed by the inverse DAT module 750 according to the extracted parameters. In some embodiments, inverse adaptive monotonic nonlinear mapping, and/or data adaptive tuning performed by the inverse DAT module 750 can be implemented in a similar manner as the SL generation module 780.

The enhanced image generation module 760 receives the base signal 755 from the inverse DAT module 750 and the SL signal 785 from the SL generation module 780, and generates the output image data 455. In the embodiment shown in FIG. 7A, the enhanced image generation module 760 receives the base signal 755 represented in the RGB color space and obtains the output image data 455 represented in the RGB color space based on the base signal 755 and the SL signal 722. Specifically, the enhanced image generation module 760 generates the output image data 455 by multiplying the base signal 755 represented in the RGB color space by the SL signal 722. That is, each color component (RGB) of the base signal 755 is multiplied by the SL signal 722. Hence, the output image data 455 can be represented as the following Equation (13):

$$RGB_{HDR}=SL*B \quad (13)$$

where $RGB_{HDR}$ corresponds to values of the output image data 455 (for red, green, blue components), SL corresponds to the SL signal 785, and B corresponds to the base signal 755 of red, green, blue color components. The output image data 455 can be provided to the sink device 470 of FIG. 4, and displayed to the user.

Figure 7B:
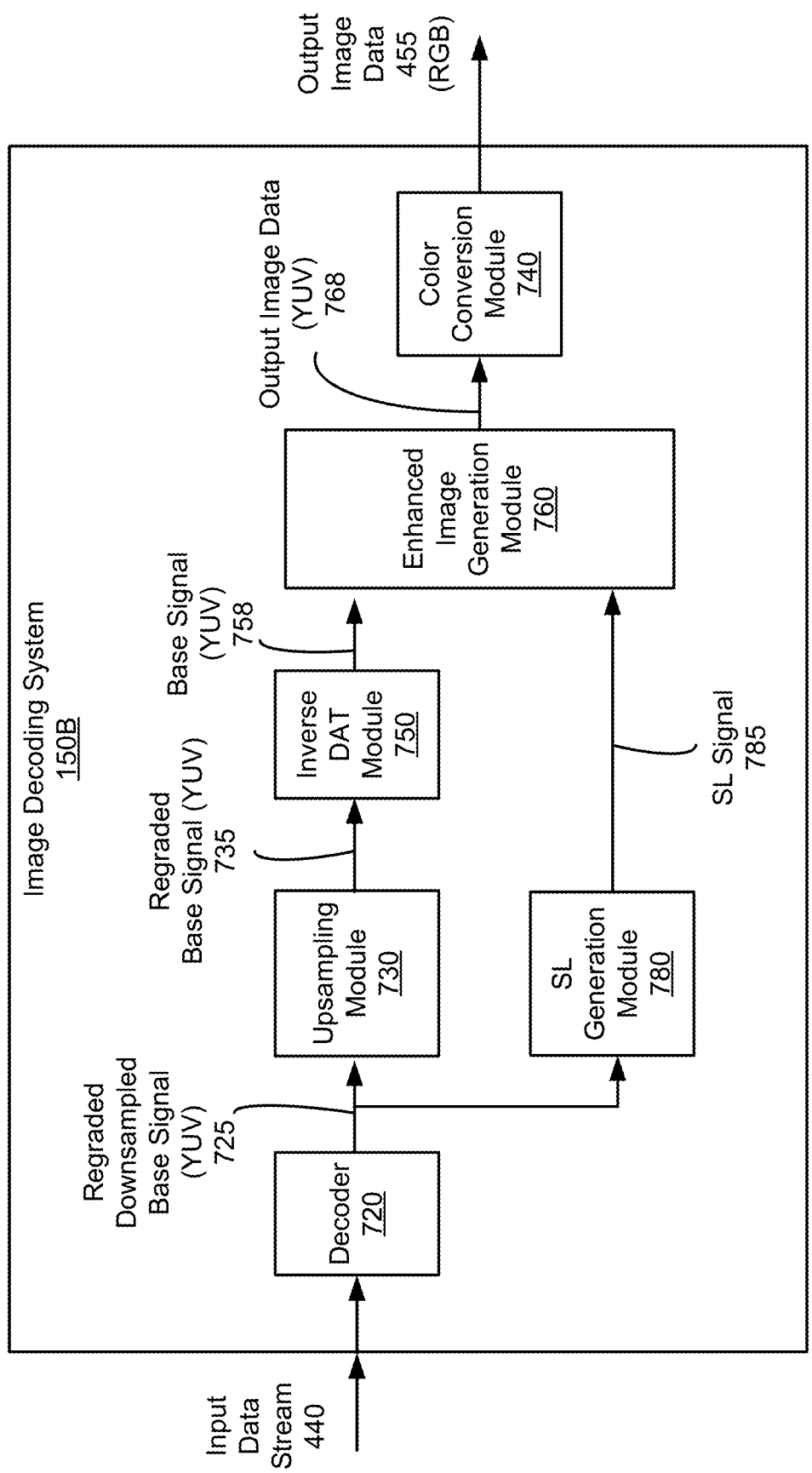
FIG. 7B illustrates an image/video decoding system according to another embodiment.

FIG. 7B illustrates an AV1 decoding system 450B according to another embodiment. The AV1 decoding system 450B receives a single input data stream 440, for example, from the AV1 encoding system 430B shown in FIG. 5B. In the embodiment shown in FIG. 7B, the AV1 decoding system 450B includes the AV1 decoder 720, the upsampling module 730, the color conversion module 740, the inverse DAT module 750, the SL generation module 780, and the enhanced image generation module 760. The configurations of these components are similar to the ones shown in FIG. 7A, except that the color conversion module 740 between the upsampling module 730 and the inverse DAT module 750 in FIG. 7A is provided after the enhanced image generation module 760 in FIG. 7B. Accordingly, the inverse DAT module 750 and the enhanced image generation module 760 operate in the YUV color space. The decoder 720, the SL generation module 780, and the upsampling module 730 operate as shown in FIG. 7A. Thus, the detailed description thereof is omitted herein for the sake of brevity.

In the embodiment shown in FIG. 7B, the inverse DAT module 750 receives the graded base signal 735 represented in the YUV color space, and obtains the base signal 758 represented in the YUV color space. In this embodiment, the inverse DAT module 750 performs inverse adaptive monotonic nonlinear mapping with data adaptive tuning in the YUV color space, instead of the RGB color space.

The enhanced image generation module 760 receives the base signal 758 represented in the YUV color space from the inverse DAT module 750, and the SL signal 785 from the SL generation module 780 to generate the output image data 768 represented in the YUV color space. In one embodiment, the enhanced image generation module 760 obtains the output image data 768 according to Equation (14) below:

$$Y_{HDR}=Y_{SDR}*Y\_SL, Cb_{HDR}=Cb_{SDR}*Cb\_SL,$$
$$Y_{HDR}=Cr_{SDR}*Cr\_SL \quad (14)$$

where $Y_{HDR}$ is a luminance component of the output image data 768 represented in the YUV color space, $Cb_{HDR}$ is a blue difference chroma component of the output image data 768 represented in the YUV color space, $Cr_{HDR}$ is a red difference chroma component of the output image data 768 represented in the YUV color space, Y_SL can be a luminance component of the SL signal 785, Cb_SL can be a derived blue difference chroma component of the SL signal 785, and Cr_SL can be a derived red difference component of the SL signal 785. $Y_{SDR}$ is a luminance component of the base signal 758 represented in the YUV color space, $Cb_{SDR}$ is a blue difference chroma component of the base signal 758 represented in the YUV color space, and $Cr_{SBR}$ is a red difference chroma component of the base signal 758 represented in the YUV color space. In some embodiments, the Cb_SL and Cr_SL can be replaced with Y_SL.

In the embodiment shown in FIG. 7B, the color conversion module 740 receives the output image data 768 represented in the YUV color space, and performs color conversion to obtain the output image data 455 represented in the RGB color space.

Figure 7C:
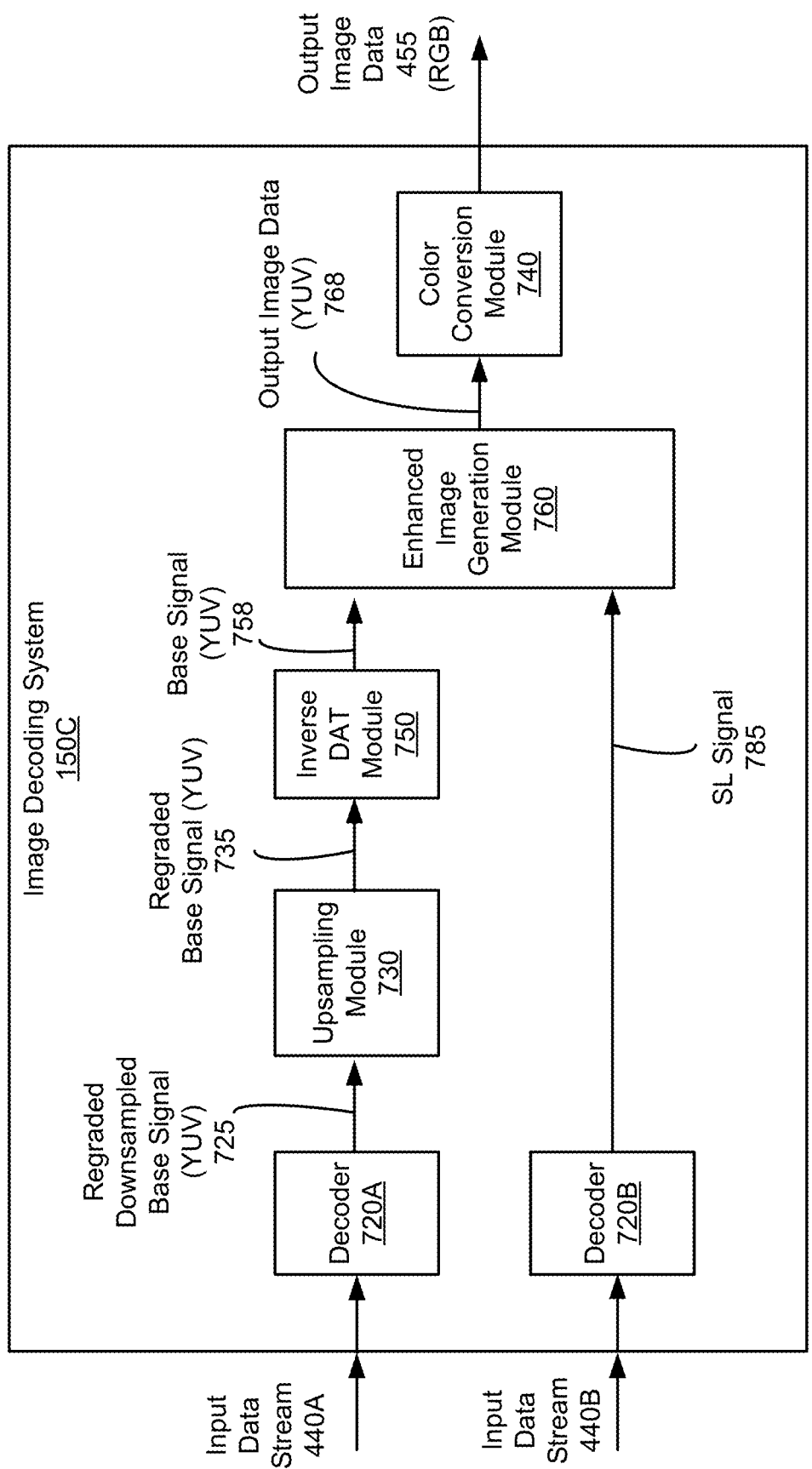
FIG. 7C illustrates an image/video decoding system according to another embodiment.

FIG. 7C illustrates an AV1 decoding system 450C according to another embodiment. The AV1 decoding system 450C receives dual input data streams 440A and 440B, for example, from the AV1 encoding system 430C shown in FIG. 5C. In the embodiment shown in FIG. 7C, the AV1 decoding system 450B includes the AV1 decoders 720A, 720B, the upsampling module 730, the color conversion module 740, the inverse DAT module 750, and the enhanced image generation module 760. The configurations of these components are similar to the ones shown in FIG. 7B, except that the SL generation module 780 of FIG. 7B is omitted and an additional AV1 decoder 720B is provided to obtain the SL signal 785. The AV1 decoder 720A, the upsampling module 730, the inverse DAT module 750, the enhanced image generation module 760, and the color conversion module 740 operate as shown in FIG. 7B. Thus, the detailed description thereof is omitted herein for the sake of brevity.

In the embodiment shown in FIG. 7C, the AV1 decoder 720B receives the input data stream 440B including an encoded SL signal, and decodes the input data stream 440B to obtain the SL signal 785.

In this embodiment shown in FIG. 7C, a simple decoding process is performed by the AV1 decoder 720B, without implementing the SL generation module 780 of FIG. 5 to infer the SL signal 785. Hence, the computing resource of the AV1 decoding system 450C can be reduced compared to the AV1 decoding system 450C of FIG. 7B, at the cost of additional bandwidth for receiving the input data stream 440B.

Figure 8:
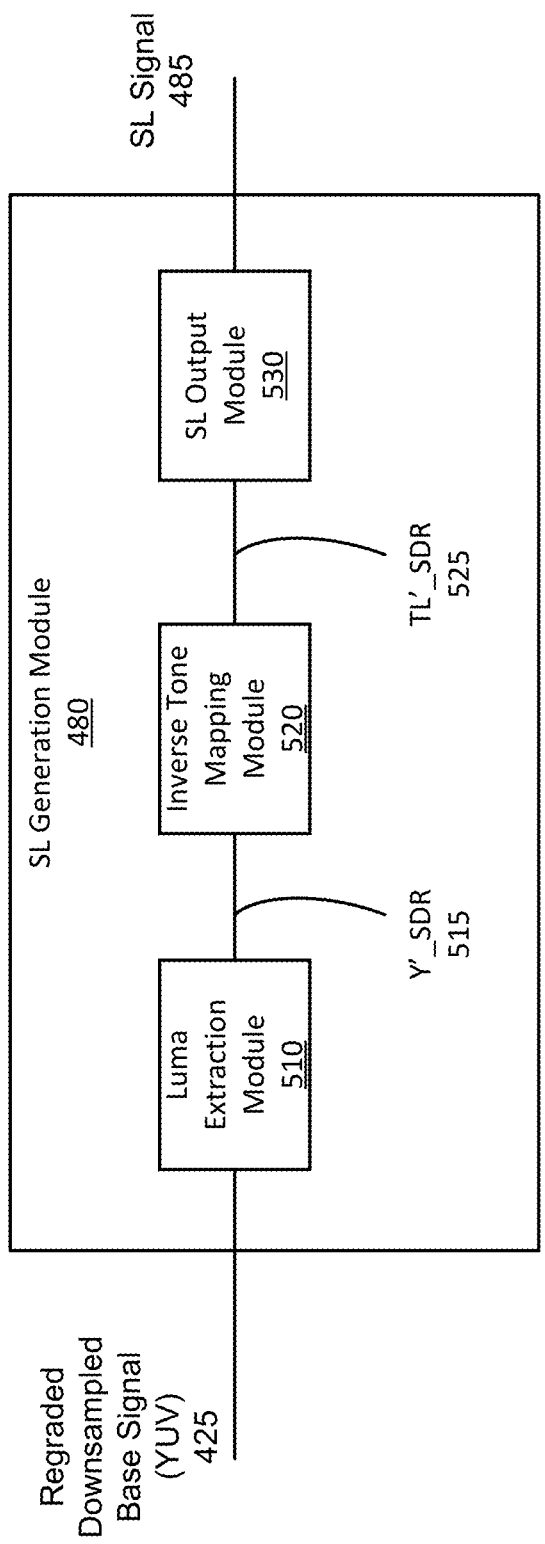
FIG. 8 illustrates a smoothed luminance generation module of the image/video decoding system according to another embodiment.

FIG. 8 is a smoothed luminance generation module 780 of the AV1 decoding system 450A or 450B, according to another embodiment. The SL generation module 780 receives the graded downsampled base signal 725 and parameters used for performing adaptive tone mapping and/or DAT by the AV1 encoding system 430 and generates (or infers) the SL signal 785. In one embodiment, the SL generation module 780 includes a luma extraction module 810, an inverse tone mapping module 820, and a SL output module 830. These components can be implemented as hardware, software, firmware, or a combination thereof. In alternative embodiments, different and/or additional components may be included or some components may be omitted.

The luma extraction module 810 receives the graded downsampled base signal 725 from the AV1 decoder 720, and obtains a luminance component Y'_SDR 815 of the graded downsampled base signal 725.

The inverse tone mapping module 820 receives parameters used for performing adaptive tone mapping and/or DAT from the AV1 decoder 720 and determines an inverse tone mapping to be applied. The inverse tone mapping module 820 applies the inverse tone mapping to the luminance component Y'_SDR 815 to obtain TL'_SDR 825.

The SL output module 830 receives the TL'_SDR 825 from the inverse tone mapping module 820, and applies the luminance component Y'_SDR 815 to the TL'_SDR 825 to generate the SL signal 785.

Figure 9A:
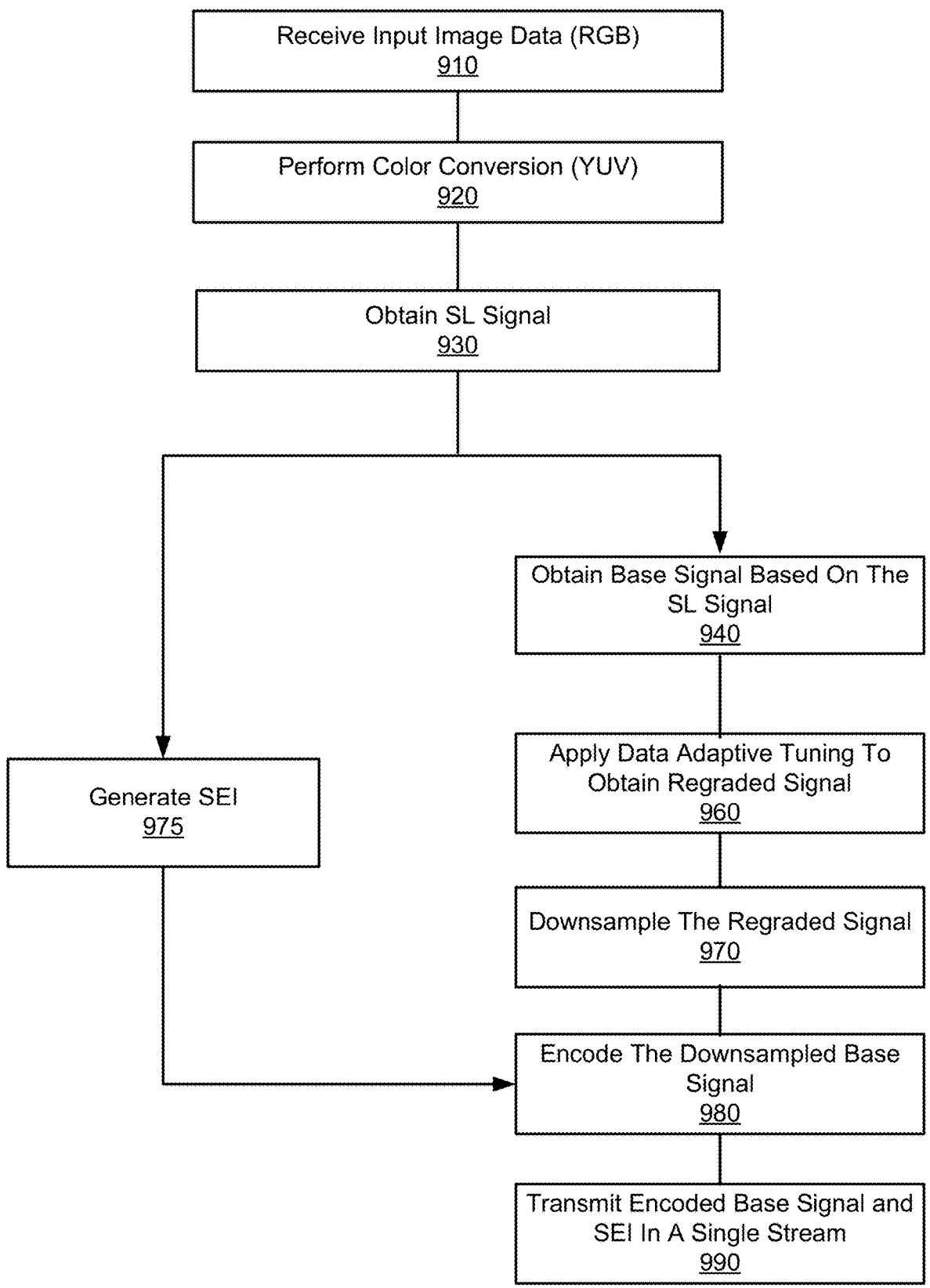
FIG. 9A is a flow chart illustrating a process of encoding high dynamic range image/video data into a single stream according to one embodiment.

FIG. 9A is a flow chart illustrating a process of encoding high dynamic range image data into a single stream according to one embodiment. The steps shown in FIG. 9A can be performed by the AV1 encoding system 430 (e.g., AV1 encoding system 430B of FIG. 2B). In other embodiments, some or all of the steps may be performed by other entities. In addition, some embodiments may perform the steps in parallel, perform the steps in different orders, or perform different steps.

The AV1 encoding system 430 receives 910 input image data 415. In one embodiment, the input image data 415 is represented in the RGB color space.

The AV1 encoding system 430 performs 920 color conversion to obtain the input image data 518 represented in the YUV color space.

The AV1 encoding system 430 obtains 930 a SL signal 525 based on the input image data 518 represented in the YUV color space. In one embodiment, the AV1 encoding system 430B implements data adaptive tuning to obtain the SL signal 525.

The AV1 encoding system 430 obtains 940 a base signal 538 represented in the YUV color space based on the SL signal 525. In one embodiment, the base signal 538 is obtained by dividing the input image data 518 represented in the YUV color space with the SL signal 525. Specifically, each of the luminance component and chroma components of the base signal 538 can be divided by the SL signal 525.

The AV1 encoding system 430 applies 960 data adaptive tuning to the base signal 538 to obtain the graded base signal 548. The data adaptive tuning can be performed based on, for example, statistics of the base signal (e.g., luminance distribution). In one embodiment, the data adaptive tuning is performed in the YUV color space.

The AV1 encoding system 430 downsamples 970 the graded base signal 548 to obtain the downsampled base signal 565. In one embodiment, the AV1 encoding system 430 downsamples the graded base signal 548 represented in the 4:4:4 format into the 4:2:0.

The AV1 encoding system 430 encodes 980 the downsampled base signal 565. In one embodiment, the AV1 encoding system 430 generates metadata or SEI describing parameters used for performing data adaptive tuning. The AV1 encoding system 430 generates a data stream 440 by adding the metadata or the SEI to the encoded base signal. In another embodiment, the AV1 encoding system 430 encodes the SL signal and adds the encoded SL signal to the data stream 440.

The AV1 encoding system 430 transmits 990 the data stream 440 including the encoded base signal and the SEI to the AV1 decoding system 450.

Figure 9B:
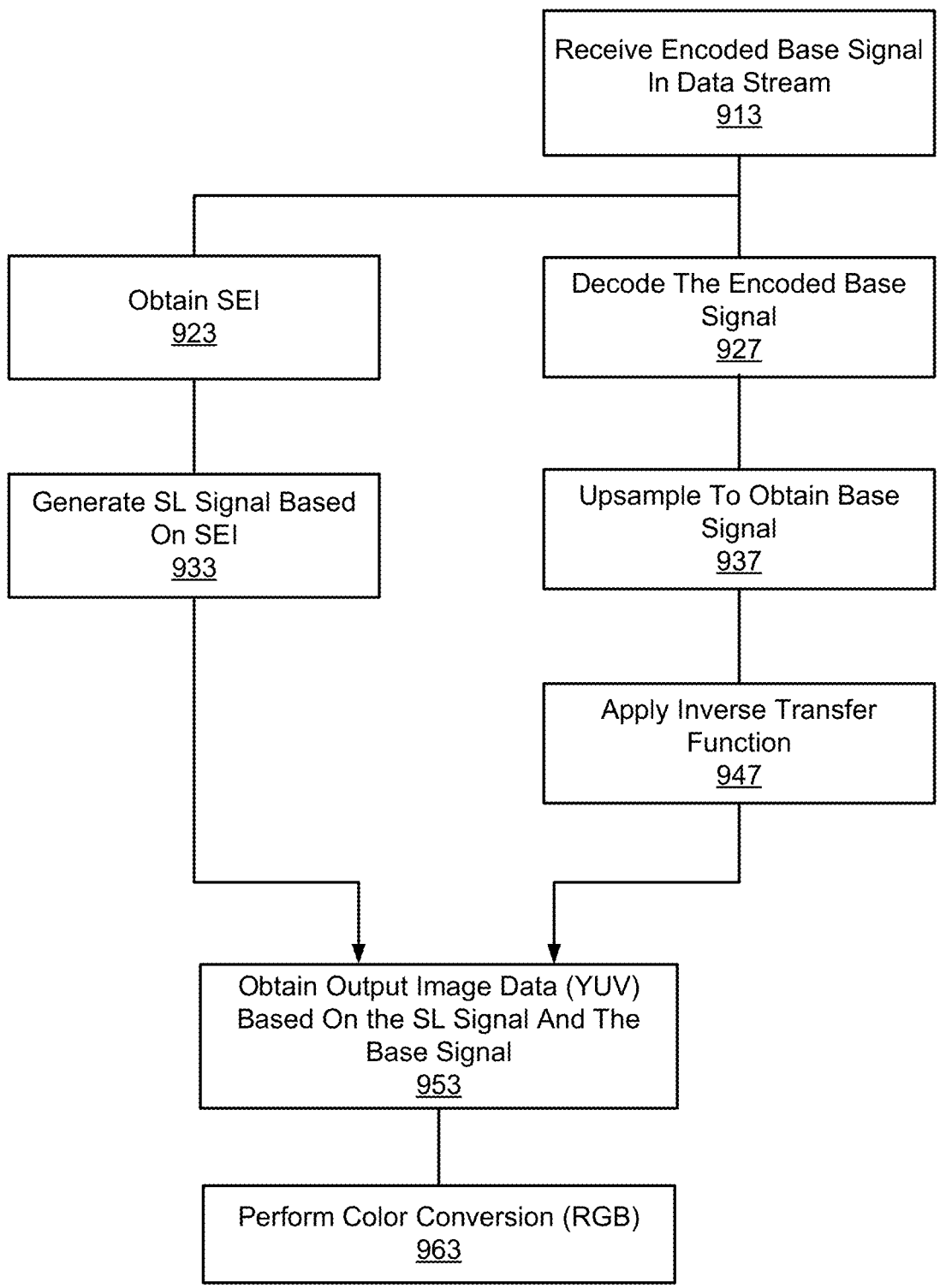
FIG. 9B is a flow chart illustrating a process of decoding a single stream into high dynamic range image/video data according to one embodiment.

FIG. 9B is a flow chart illustrating a process of decoding a single stream into high dynamic range image data according to one embodiment. The steps shown in FIG. 9B can be performed by the AV1 decoding system 450 (e.g., AV1 encoding system 450B of FIG. 7B). In other embodiments, some or all of the steps may be performed by other entities. In addition, some embodiments may perform the steps in parallel, perform the steps in different orders, or perform different steps.

The AV1 decoding system 450 receives 913 a single data streaming including an encoded base signal. The AV1 decoding system 450 decodes 927 the encoded base signal to obtain a graded downsampled base signal 725 represented in the YUV color space.

The AV1 decoding system 450 decodes 923 the encoded base signal to obtain SEI describing parameters used for performing DAT at the encoding system 430.

The AV1 decoding system upsamples 937 the graded downsampled base signal 725 represented in the YUV color space to obtain a graded base signal 735 represented in the YUV color space. In one embodiment, the AV1 decoding system upsamples the graded downsampled base signal 725 in the 4:2:0 format into the 4:4:4 format.

The AV1 decoding system 450 applies 947 inverse DAT to the graded base signal 735 to obtain the base signal 758 represented in the YUV color space. In one embodiment, the AV1 decoding system 450 can determine inverse DAT to the DAT applied in the AV1 encoding system 430 based on the SEI.

The AV1 decoding system 450 generates 933 (or infers) the SL signal 485 based on the SEI. In one embodiment, the AV1 decoding system 450 determines an inverse tone mapping to be applied based on the SEI. The AV1 decoding system 450 applies the inverse tone mapping to a luminance component Y'_SDR 815 to obtain TL'_SDR 825, and then generates the SL signal 785 by applying the luminance component Y'_SDR 815 to the TL'_SDR 825.

The AV1 decoding system 450 obtains 953 output image data 768 represented in the YUV color space based on the SL signal 785 and the base signal 758. In one embodiment, the output image data 768 represented in the YUV color space is obtained by multiplying the base signal 758 represented in the YUV color space with the SL signal 785. Specifically, each of the luminance component and chroma components of the base signal 758 can be multiplied by the SL signal 525.

The AV1 decoding system 450 performs 963 color conversion on the output image data 768 represented in the YUV color space into the RGB color space.

Figure 10A:
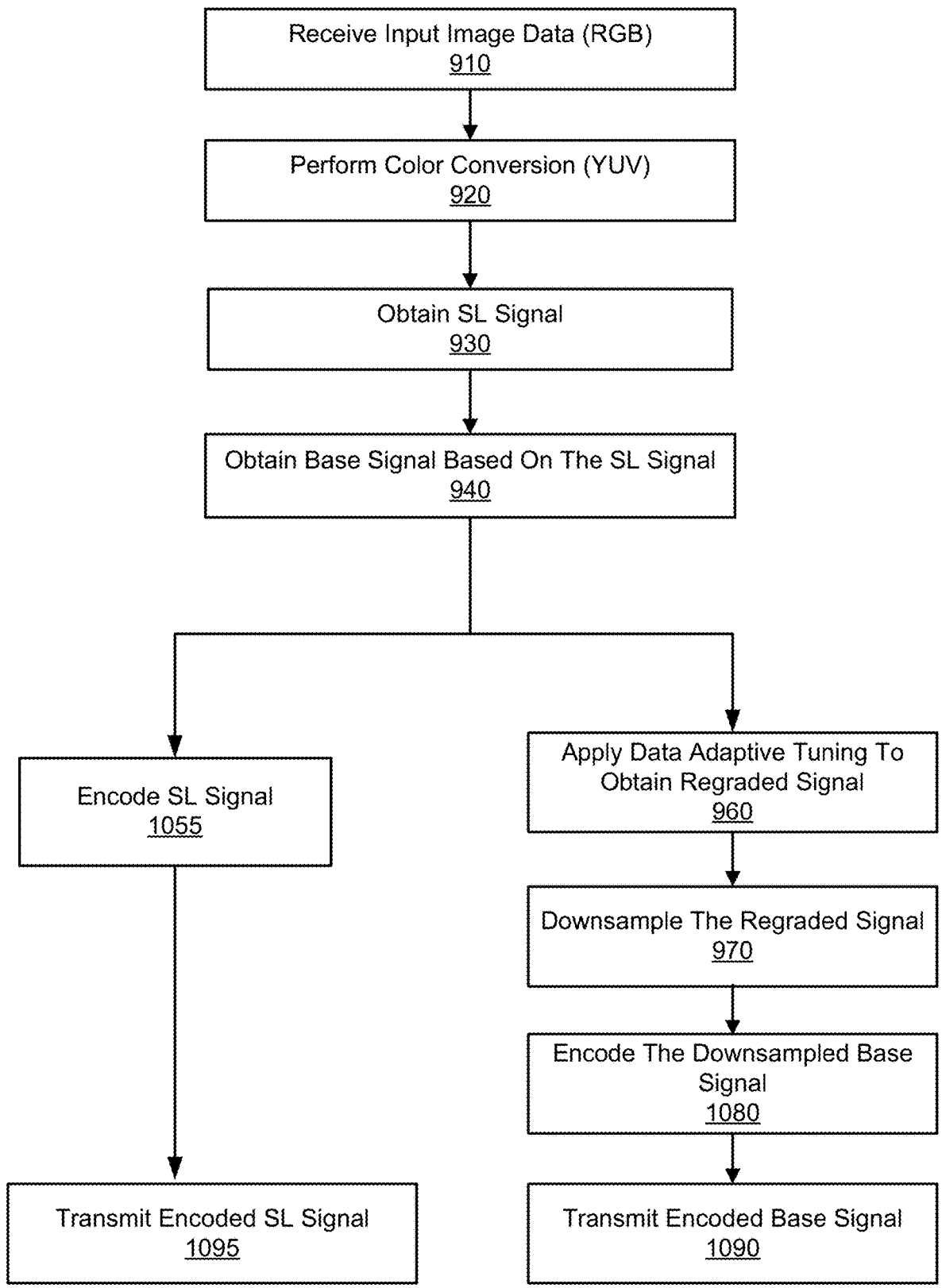
FIG. 10A is a flow chart illustrating a process of encoding high dynamic range image/video data into two data streams according to one embodiment.

FIG. 10A is a flow chart illustrating a process of encoding high dynamic range image data into dual streams 440A, 440B, according to one embodiment. The steps shown in FIG. 10A can be performed by the AV1 encoding system 430 (e.g., AV1 encoding system 430C of FIG. 2C). The steps 910, 920, 930, 940, 960, and 970 are identical to the ones shown in FIG. 9A, except that the steps 975, 980, 990 of FIG. 9A are replaced with steps 1055, 1080, 1090, 1095. Therefore, the detailed description of the steps 910, 920, 930, 940, 960, and 970 is omitted herein for the sake of brevity. In other embodiments, some or all of the steps may be performed by other entities. In addition, some embodiments may perform the steps in parallel, perform the steps in different orders, or perform different steps.

In the embodiment shown in FIG. 10A, the AV1 encoding system 430 encodes 1080 the downsampled base signal to generate a first data stream 440A, irrespective of the SL signal. In addition, the AV1 encoding system 450 encodes 1055 the SL signal 525 to generate a second data stream 440B.

The AV1 encoding system 430 transmits 1090 the first data stream 440A including the encoded base signal, and transmits 1095 the second data stream 440B including the encoded SL signal to the AV1 decoding system 450.

Figure 10B:
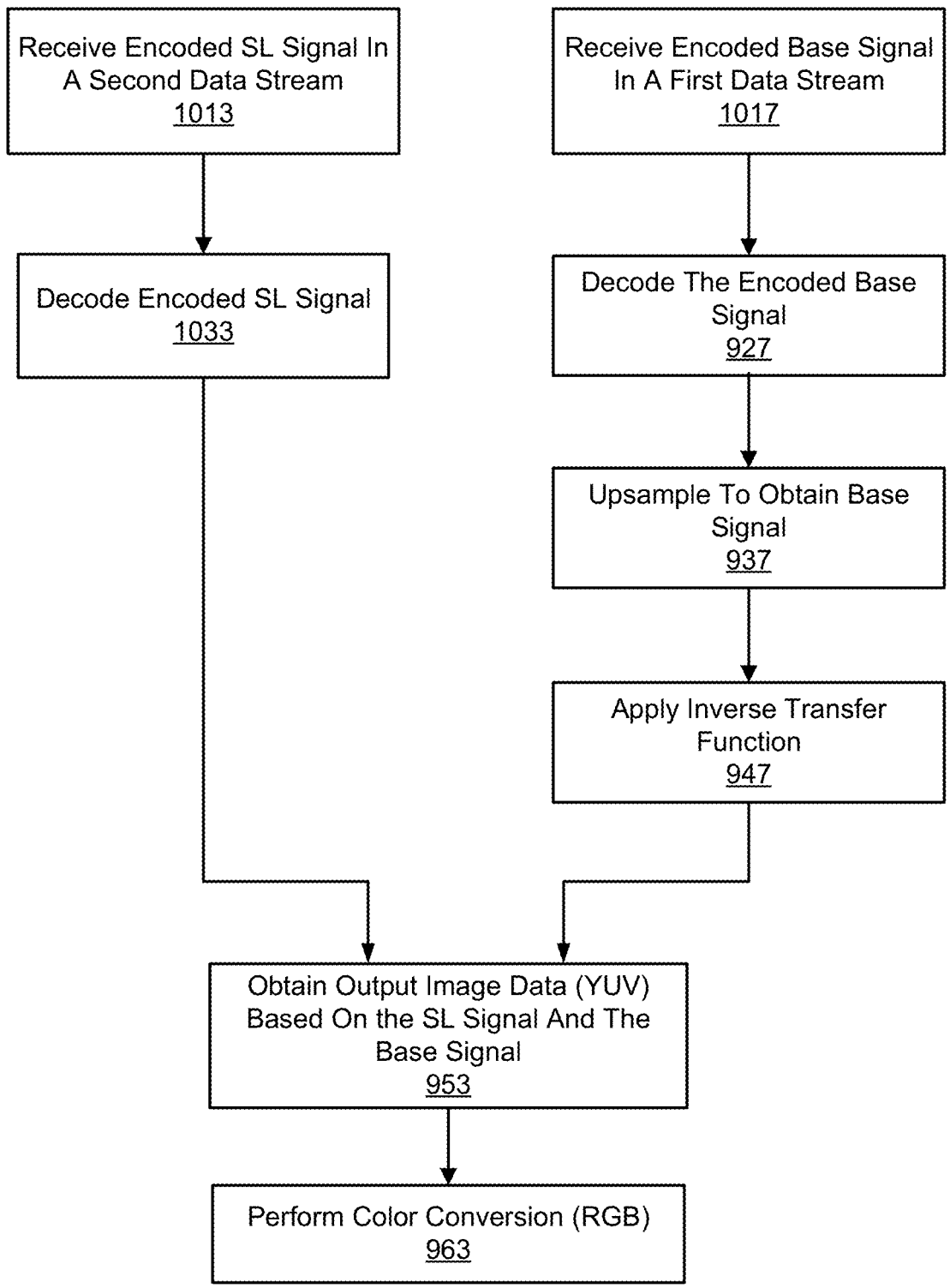
FIG. 10B is a flow chart illustrating a process of decoding two streams into high dynamic range image/video data according to one embodiment.

FIG. 10B is a flow chart illustrating a process of decoding dual streams into high dynamic range image data according to one embodiment. The steps shown in FIG. 10B can be performed by the AV1 decoding system 450 (e.g., AV1 encoding system 450C of FIG. 4C). The steps 927, 937, 947, 953, and 963 in FIG. 10B are identical to the ones shown in FIG. 9B, except that the steps 913, 923, 933 of FIG. 9B are replaced with steps 1013, 1017, 1033. Therefore, the detailed description thereof is omitted herein for the sake of brevity. In other embodiments, some or all of the steps may be performed by other entities. In addition, some embodiments may perform the steps in parallel, perform the steps in different orders, or perform different steps.

In the embodiment shown in FIG. 10B, the AV1 decoding system 450 receives 913 a first data stream 440A including an encoded base signal, and receives 1013 a second data stream 440B including encoded SL signal. The AV1 decoding system 450 can decode 927 the encoded base signal in the first data stream 440A. Similarly, the AV1 decoding system 450 can decode 1033 the encoded SL signal in the second data stream 440B to generate the SL signal 785.

Figure 11A:
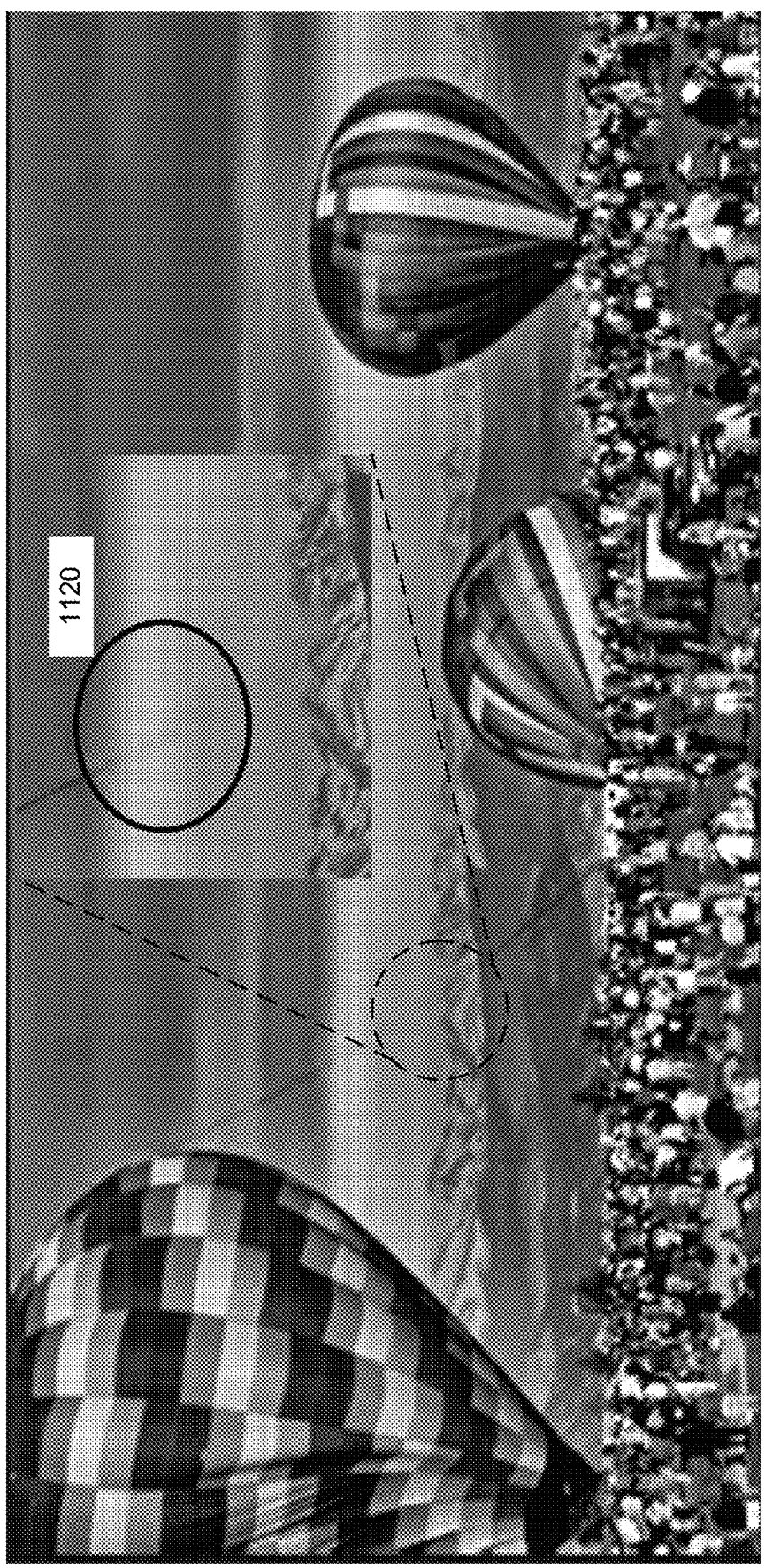
FIG. 11A is an example of a reconstructed sample image using a conventional high dynamic range encoding and decoding.
Figure 11B:
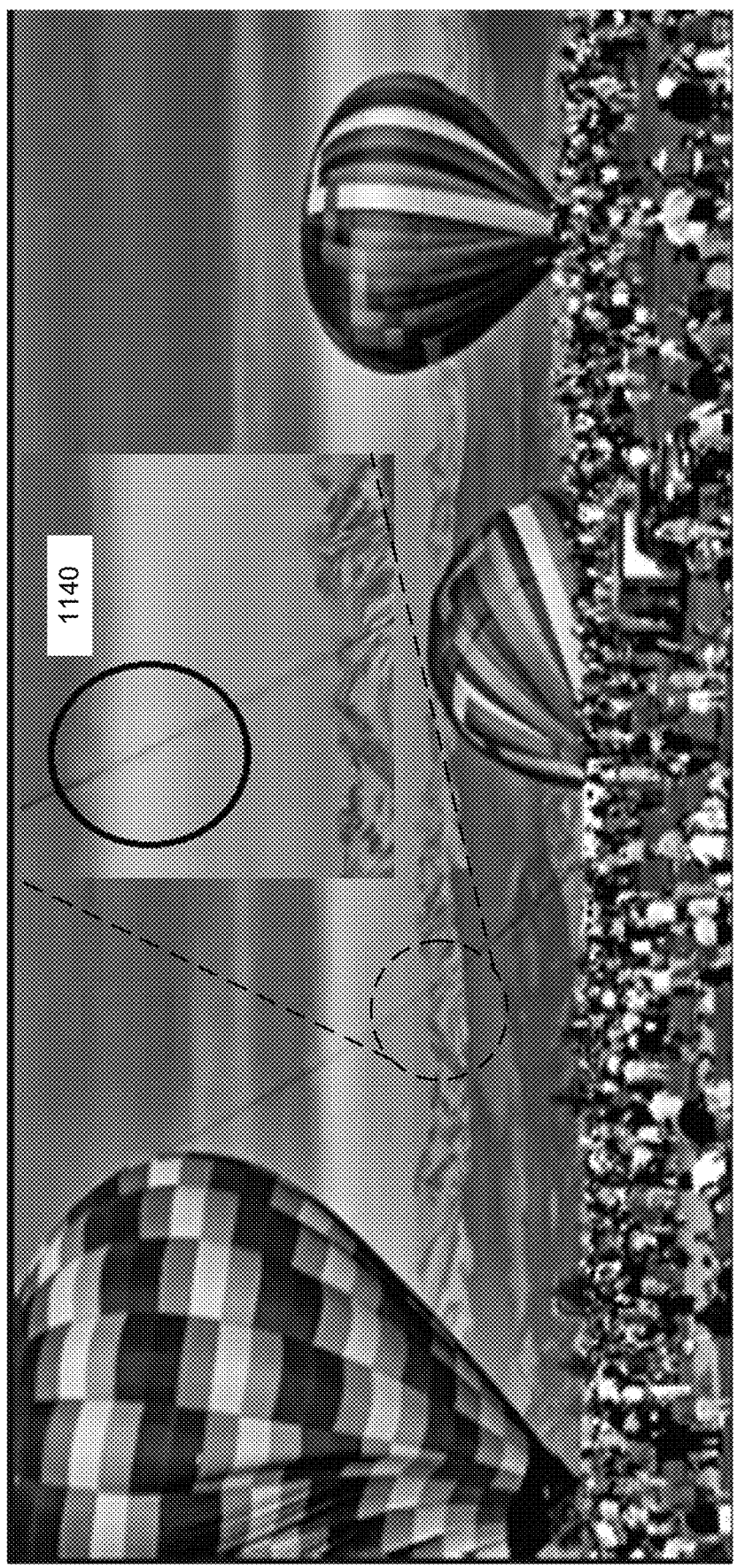
FIG. 11B is an example of a reconstructed sample image shown in FIG. 8A using enhanced high dynamic range encoding and decoding according to one embodiment.
Figure 12:
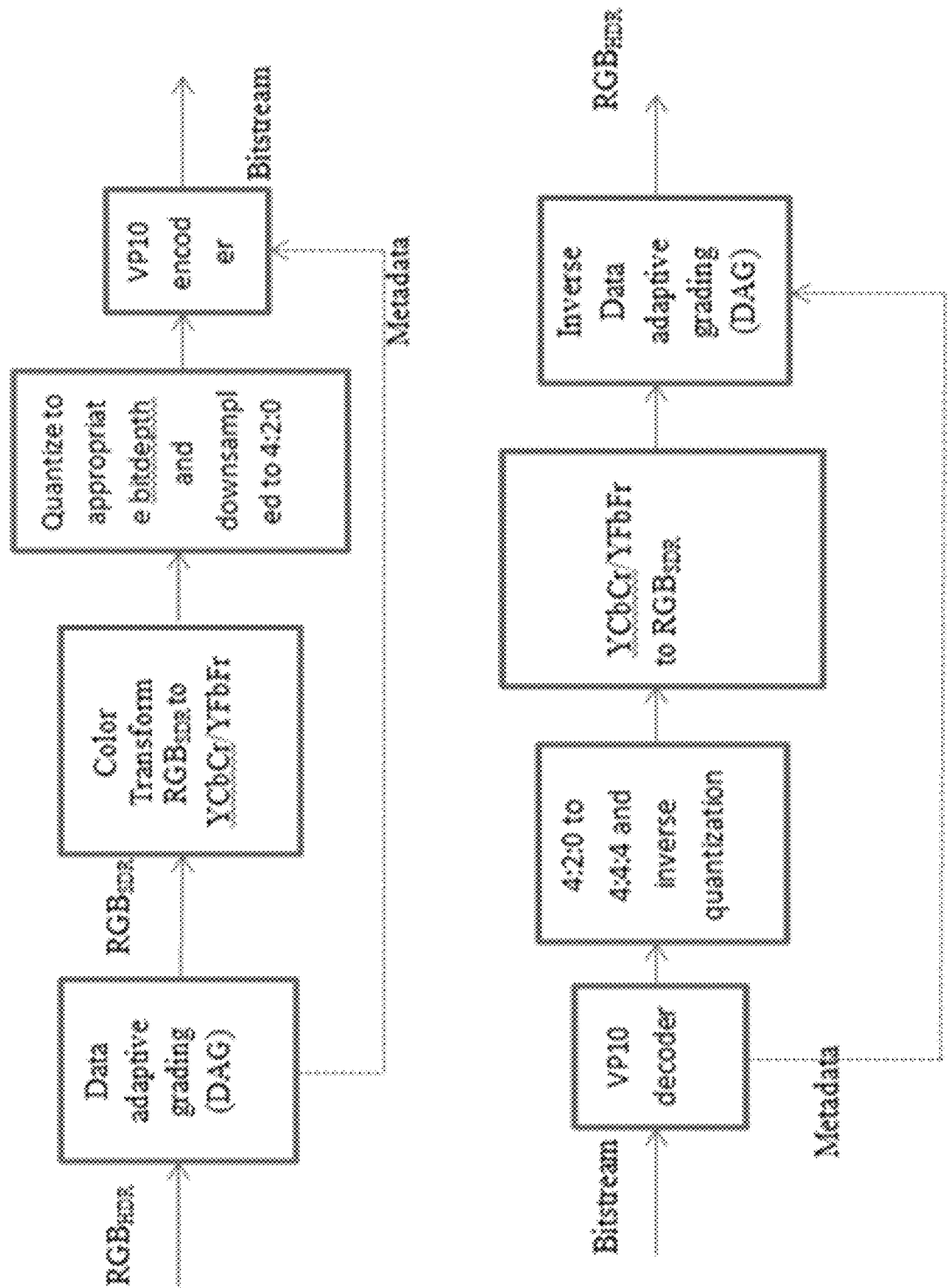
FIG. 12 illustrates the coding tool chain for HDR/WCG content according to an embodiment.

FIG. 11A is an example of a reconstructed sample image using a conventional AV1 encoding and decoding. FIG. 11B is an example of a reconstructed sample image shown in FIG. 11A using enhanced high dynamic range AV1 encoding and decoding according to one embodiment. As shown in FIG. 11B, a high dynamic range image can be encoded and decoded through AV1 according to one or more embodiments disclosed herein, while preserving details of the image (e.g., a line 1140).

Data Adaptive Grading in VPX

Figure 13:
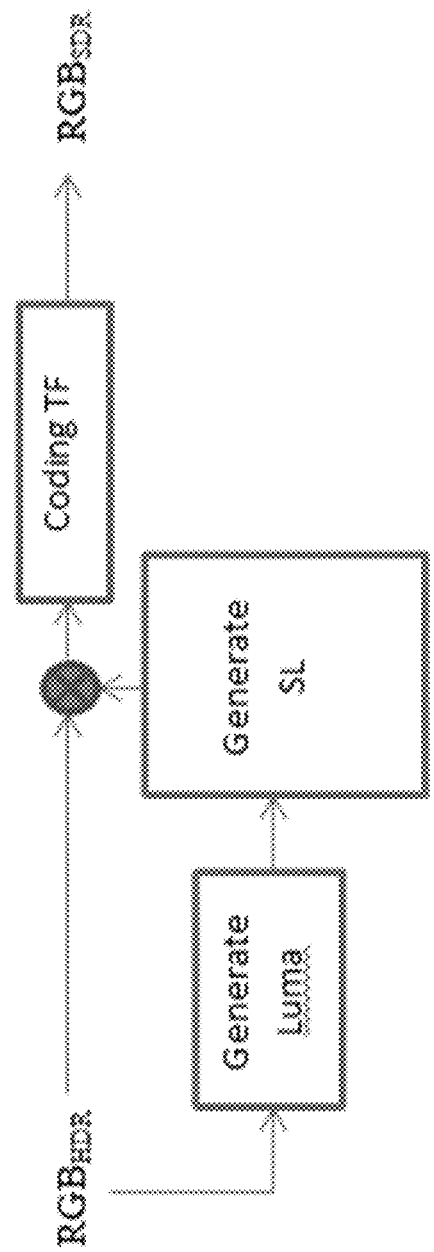
FIG. 13 illustrates the sequential steps involved in the DAG process according to an embodiment.

Embodiments concern a HDR video coding tool, "FV10," which is based on utilizing HEVC Main10 Profile to its fullest capabilities. In particular, the data adaptive grading (DAG) from FV10 is here implemented in libvpx (VPX codec library) to automatically grade HDR data; it is thus used to encode linear light HDR/WCG content, with VP10. FIG. 13 illustrates the coding tool chain for HDR/WCG content according to an embodiment.

Linear light $RGB_{HDR}$ input is pre-processed by a data dependent and fully automatic regrading process (DAG) that generates an $RGB_{SDR}$ signal along with metadata. The $RGB_{SDR}$ content is then color transformed to YCbCr signal—or one based on a YFbFr color space [11]. The YCbCr/YFbFr signal is quantized to the required bitdepth and then downsampled to a 4:2:0 format. Then the signal along with the metadata it is encoded using the VP10 codec. At the other end, after decoding using the VP10 decoder, a post-processing step is employed to reconstruct the signal back to linear light HDR/WCG. The post-processing step consists of sequentially upsampling to the 4:4:4 domain, inverse quantization to a floating point representation, color transform to RGB 4:4:4 domain and an inverse data adaptive grading to reconstructed $RGB_{HDR}$.

Figure 14:
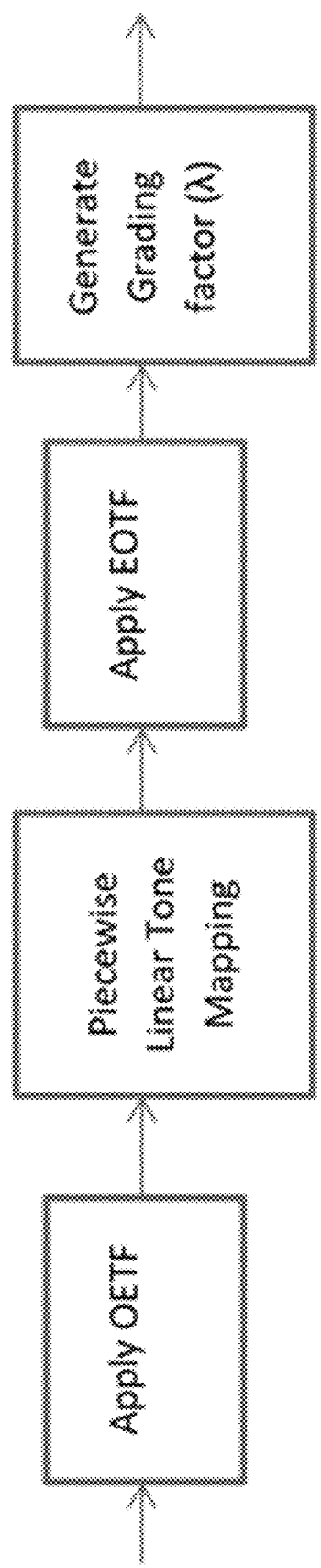
FIG. 14 illustrates the Generate Smoothed Luma (SL) process according to an embodiment.

The fully automatic DAG process is a general point operation where every HDR RGB pixel is regraded adaptively to an SDR value. In our case, the processing is done in the RGB 4:4:4 domain. FIG. 14 illustrates the sequential steps involved in the DAG process according to an embodiment. Instantiations of the individual blocks of the process are discussed below, just as an indication. Numerous other variations are possible and within the scope of our method, and have various implementations.

Generate Luma:

A luma component (Y) is generated using either the common conversion to the YCbCr color space, or to the YFbFr space (preferred). This part is linear. All other components are nonlinear, and they can be all combined into a single function for purposes of implementation.

Figure 15:
FIG. 15 shows a comparison of a cropped region (upper right corner) highlighting the visual quality difference between reference (using HDR10 pre/post processing) and the DAG approach according to an embodiment.

Generate SL:

FIG. 15 illustrates the Generate Smoothed Luma (SL) process according to an embodiment.

Apply OETF (Opto-Electronic Transfer Function):

The linear luma (Y) input signal is converted to a perceptual uniform signal($Y_{OETF}$) using ST 2084 (PQ-TF) [9]. From this point, we employ data-adaptive tuning to the transfer function to improve codeword assignment.

Piecewise Linear Tone Mapping:

A piecewise tone mapping process represented as:

$$Y'_{OETF} = a(k) * Y_{OETF} + b(k), k=0,1, \ldots, n,$$

This equation is applied where, k represents the $k^{th}$ piece or bin. The coefficients a(k), b(k) are sequence dependent and are derived based on the distribution characteristics of the HDR input signal. As a specific example, they can be based on a histogram analysis, as follows. The input luma signal is segmented to n bins, and a count is kept for the number of pixels in each bin. These equations are applied to the $Y_{OETF}$ to generate a new signal $Y'_{OETF}$. Under an optimization process, the number of bins and their respective sizes are chosen such that the lower and mid tone levels have an improved representation compared to the unadjusted transfer function representation. Thus the parameters a, b are chosen for each piece such that:

$$a(k) = \left(\frac{binsize_k}{NumTotPixels}\right) * (MAX\_DISPLAY\_LUMA / MAX\_LUMA\_BIN_k)$$

$$b(0)=0$$

$$b(k)=a(k-1)*MAX\_LUMA\_BIN_{k-1}+b(k-1)-a(k)*MAX\_LUMA\_BIN_{k-1}$$

In this equation, $MAX\_LUMA\_BIN_k$ is the maximum luma value in bin k, $binsize_k$ is the number of pixels in bin k and MAX DISPLAY LUMA be the maximum luminance of the target SDR display.

Apply EOTF (Electro-Optical Transfer Function):

The perceptual domain signal ($Y'_{OETF}$) is converted back to linear light (Y') using inverse ST 2084 (PQ-TF) [9].

Generate Grading Factor:

The grading factor for each point is calculated as:

$$\lambda = Y'/Y$$

Then an intermediate signal $RGB_{int}$ is calculated as:

$$RGB_{int} = RGB_{HDR} * \lambda$$

Coding Transfer Function(TF):

Finally, ITU-R Rec. BT.2020 power-law gamma curve [12] or ST-2084(PQ-TF) [9] is applied to $RGB_{int}$ to generate $RGB_{SDR}$.

Bitstreams are generated with the VP10 high bit depth encoder. 1-pass encoding is performed. The codec is configured for constant quality encoding with a target quality parameter (--cq-level=QP). For each sequence four rate points are generated with different QP's. Keyframes were inserted with a maximum interval of 24, 24, 32, and 48 pictures for 24 fps, 25 fps, 30 fps, and 50 fps sequences, respectively. A sample encoder/decoder configuration is specified below:

VP10 Encoder:
vpxenc --codec=vp10
--width=1920
--height=1080
--end-usage=3
--profile=2 -p 1
--verbose
--psnr
--color-space=5
--bit-depth=10
--input-bit-depth=10
--cq-level=26
--kf-max-dist=24
--fps=24
--limit=240
-o input.bin input.yuv VP10 Decoder:
vpxdec --codec=vp10
--rawvideo
-o recon.yuv input.bin At the decoder side, the bitstream is decoded to get the RGB SDR signal and metadata. Then an inverse DAG process is used to reconstruct the HDR video. The block diagram and explanations for the inverse DAG process is very similar to the DAG process. The difference is that the piecewise linear tone mapping function is flipped and the application of OETF and EOTF are interchanged.

The objective results obtained by the DAG approach are tabulated in Table 6. A modified Bjontegaard Delta Rate (BDRATE) metric is used as a measure of difference between the rate distortion (RD) curves. The RD curves obtained by using the generic pre/post processing steps of HDR10 with VP10 as the encoder are used as reference. The BDRATE is calculated for RGB-PSNR, DE100, MD100, and PSNRL100 respectively. It is asserted that such objective metrics are currently not very predictive of visual quality in HDR coding studies. FIG. 16 shows a comparison of a cropped region (upper right corner) highlighting the visual quality difference between reference (using HDR10 pre/post processing) and the DAG approach according to an embodiment. In the context of HEVC, we call the method "FV10".

TABLE 6

Objective results for HDR/WCG coding with VP10

| | X | Y | Z | XYZ | tOSNR-XYZ | DE100 | MD100 | PSNRL100 | PSNR R | PSNR G | PSNR B | PSNR RGB |
|---|---|---|---|---|---|---|---|---|---|---|---|---|
| FireEaterClip400r1 | 0.0% | 0.0% | 0.0% | 0.0% | 0.0% | 0.0% | 0.0% | 20.3% | −33.8% | −57.4% | −29.3% | −40.2% |
| Market3Clip4000r2 | 8.1% | 9.5% | 6.1% | 7.6% | −3.2% | −42.8% | 0.0% | −24.3% | −43.6% | −42.9% | −38.3% | −41.6% |
| SunRise | 16.5% | 26.6% | 21.3% | 21.5% | −4.2% | −52.6% | 0.0% | −27.8% | −50.1% | −69.2% | −46.9% | −55.4% |
| BikeSparklers cut 1 | 28.8% | 34.3% | 26.2% | 29.2% | 25.6% | −12.6% | 0.0% | 8.9% | −34.7% | −54.0% | −37.0% | −41.9% |

TABLE 6-continued

Objective results for HDR/WCG coding with VP10

| | X | Y | Z | XYZ | tOSNR-XYZ | DE100 | MD100 | PSNRL100 | PSNR R | PSNR G | PSNR B | PSNR RGB |
|---|---|---|---|---|---|---|---|---|---|---|---|---|
| BikeSparklers cut 2 | 22.1% | 29.4% | 189.4% | 22.3% | 330.5% | −7.6% | −14.2% | 11.6% | −32.9% | −35.6% | −45.4% | −38.0% |
| GarageExit | 18.4% | 28.8% | 9.1% | 16.4% | 11.9% | −14.8% | 0.0% | 7.6% | −43.2% | −22.8% | −54.5% | −40.2% |
| ShowGirl2Teaser | 21.8% | 24.6% | 93.2% | 50.1% | 47.6% | 9.0% | 0.0% | 1.4% | −50.3% | −55.1% | −49.8% | −51.8% |
| StEM_MagicHour cut 1 | 5.1% | 9.6% | 6.7% | 6.9% | 4.9% | −11.7% | 0.0% | 0.6% | −70.7% | −53.4% | −49.5% | −57.9% |
| StEM_MagicHour cut 3 | 13.2% | 16.4% | −4.6% | 1.3% | 0.5% | −8.0% | −57.0% | 5.1% | −56.3% | −79.4% | −34.3% | −56.6% |
| StEM_WarmNight cut 1 | 14.2% | 16.8% | 13.4% | 14.6% | 13.3% | −9.6% | 0.0% | 1.1% | −23.8% | −60.4% | −73.0% | −52.4% |
| BalloonFestival | 1.3% | 14.1% | 13.1% | 10.0% | −1.1% | −29.8% | 0.0% | −16.0% | −47.8% | −67.2% | −55.1% | −56.7% |
| EBU_04_Hurdles | −16.4% | −3.1% | −18.9% | −14.6% | −20.2% | 0.0% | 0.0% | −12.7% | −60.6% | −34.7% | −29.7% | −41.7% |
| EBU_06_Start | 9.1% | 20.3% | 12.8% | 13.7% | 1.6% | −40.4% | 0.0% | −11.7% | −38.9% | −42.9% | −49.3% | −43.7% |
| Overall | 10.9% | 17.5% | 28.3% | 13.8% | 31.3% | −17.0% | −5.5% | −2.8% | −45.1% | −51.9% | −23.6% | −40.2% |

Backward Compatibility: HDR/WCG content has a brightness in the range of the order of 0.005 to 1000 nits or higher and has a wider color gamut (represented by BT. 2020). The DAG approach described above automatically grades the brightness of the content (depending on the target display luminance) and the color gamut (BT. 2020 to BT. 709) to produce a backward compatible SDR content. Example SDR reconstructions will be shown at presentation.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon.

Certain embodiments are described herein as including logic or a number of components, modules (herein may be also referred to as "tools"), or mechanisms, for example, as illustrated in the figures. Modules (or components) may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In some embodiments, a software module is implemented with a computer program product comprising a computer-readable medium containing computer program code, which can be executed by a computer processor for performing any or all of the steps, operations, or processes described.

In some embodiments, a hardware module may be implemented electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. Hardware module implemented herein may be implemented in dedicated and permanently configured circuitry, or in temporarily configured circuitry (e.g., configured by software).

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

The above description is included to illustrate the operation of the preferred embodiments and is not meant to limit the scope of the invention. The scope of the invention is to be limited only by the following claims. From the above discussion, many variations will be apparent to one skilled in the relevant art that would yet be encompassed by the spirit and scope of the invention.

What is claimed is:

1. A method of encoding videos comprising:
   receiving, by a source device, a first signal representing a video and having a first dynamic range;
   processing, by the source device, the first signal to generate a second signal and metadata, the second signal having a second dynamic range, the second dynamic range being smaller than the first dynamic range, the metadata enabling a decoder to produce a high-quality third signal with the first dynamic range based on the second signal, comprising:
      extracting, from the first signal, a luminance signal;
      smoothing the luminance signal to generate a smoothed luminance signal, based upon a difference between the first dynamic range and the second dynamic range;
      generating the second signal based on a preliminary second signal generated by dividing the first signal by the smoothed luminance signal; and
   encoding, by the source device, the second signal and the metadata into a combined bitstream.

2. The method of claim 1, wherein the source device encodes the first signal using a codec selected from a group consisting of: VP9, VP10, AV1, and codecs developed by aomedia.org.

3. The method of claim 1, wherein the first dynamic range is a high dynamic range (HDR), and the second dynamic range is a standard dynamic range (SDR).

4. The method of claim 1, wherein processing the first signal further comprises:
   grading the preliminary second signal using adaptive monotonic nonlinear mapping with data adaptive tuning;
   quantizing the graded preliminary second signal to a selected bit-depth to generate the second signal; and
   generating the metadata describing the smoothed luminance signal and the data adaptive tuning.

5. The method of claim 4, wherein the selected bit-depth is less than an original bit-depth of the first signal.

6. The method of claim 4, wherein smoothing the luminance signal comprises:
   selecting a number of bins to apply to the luminance signal;
   automatically determining a binsize for each of the selected number of bins of according to one or more luminance distribution characteristics of the luminance signal;
   generating a luminosity histogram for the luminance signal according to the determined binsizes and the selected number of bins; and
   generating the smoothed luminance signal by applying tone mapping-based nonlinearities to the luminance signal based on the luminosity histogram.

7. The method of claim 4, wherein the first signal comprises a plurality of color components, and generating the preliminary second signal comprises:
   dividing each color component of the first signal by the smoothed luminance signal.

8. The method of claim 4, wherein performing the adaptive monotonic nonlinear mapping with the data adaptive tuning to the second signal comprises:
   applying a first transfer function to the preliminary second signal to generate a transformed second signal;
   tone mapping the transformed second signal based on distribution characteristics of the smoothed luminance signal; and
   applying a second transfer function to the tone-mapped second signal, the second transfer function being an inverse of the first transfer function.

9. The method of claim 8, wherein the first transfer function is an opto-electrical transfer function (OETF) and the second transfer function is an electro-optical transfer function (EOTF).

10. The method of claim 4, wherein the data adaptive tuning is performed on the second signal at a level selected from a group consisting of: sequence, group of pictures (GOP), frame, slice, and block.

11. The method of claim 4, wherein generating the metadata comprises:
   determining a subset of parameters to describe the smoothed luminance signal, the subset of parameters comprising one or more parameters selected from a group consisting of: input peak brightness, a target peak brightness, a number of bins, and binsizes.

12. The method of claim 1, wherein smoothing the luminance signal to generate the smoothed luminance signal comprises:
   applying a first transfer function to the luminance signal to generate a transformed luminance signal, wherein a coefficient of the first transfer function for each of a plurality of frames of the first signal is selected based upon a peak brightness of the frame;
   tone mapping the transformed transformed luminance signal based on a distribution characteristic of the luminance signal to generate a mapped luminance signal; and
   applying a second transfer function to the mapped luminance signal to generate the smoothed luminance signal, the second transfer function being an inverse of the first transfer function.

13. A non-transitory computer-readable storage medium comprising instructions that when executed by a processor cause the processor to:
   receive a first signal representing a video and having a first dynamic range;
   process the first signal to generate a second signal and metadata, the second signal having a second dynamic range, the second dynamic range being smaller than the first dynamic range, the metadata enabling a decoder to produce a high-quality third signal with the first dynamic range based on the second signal, comprising:
      extracting, from the first signal, a luminance signal;
      smoothing the luminance signal to generate a smoothed luminance signal, based upon a difference between the first dynamic range and the second dynamic range;

generating the second signal based on a preliminary second signal generated by dividing the first signal by the smoothed luminance signal; and encode the second signal and the metadata into a combined bitstream.

14. A method of decoding a coded high dynamic range bitstream comprising:

receiving a combined bitstream;

decoding the combined bitstream to obtain a first signal and metadata, the first signal having a first dynamic range;

obtaining a smoothed luminance signal based on the metadata;

regrading the first signal using inverse adaptive monotonic nonlinear mapping with data adaptive tuning; and generating a second signal by multiplying the regraded first signal by the smoothed luminance signal, the second signal having a second dynamic range, the second dynamic range being larger than the first dynamic range, the second signal representing a video.

15. The method of claim 14, wherein the combined bitstream is decoded using a codec selected from a group consisting of: VP9, VP10, AV1, and codecs developed by aomedia.org.

16. The method of claim 14, wherein the first dynamic range is a standard dynamic range (SDR) and the second dynamic range is a high dynamic range (HDR).

17. The method of claim 14, wherein the regraded first signal comprises a plurality of color components, and generating the second signal comprises:

multiplying each color component of the regraded first signal by the smoothed luminance signal.

18. The method of claim 14, wherein the second signal has a bit-depth greater than an original bit-depth of the first signal.

19. The method of claim 14, further comprising:

extracting one or more parameters from the metadata, wherein the smoothed luminance signal can be generated from the extracted one or more parameters.

20. The method of claim 14, wherein performing the inverse adaptive monotonic nonlinear mapping with data adaptive tuning comprises:

applying an electro-optical transfer function (EOTF) to the first signal to generate an EOTF first signal;

inverse tone mapping the EOTF first signal based on the distribution characteristics of the smoothed luminance signal; and applying an opto-electrical transfer function (OETF) to the inverse tone mapped first signal.

* * * * *